June 2, 1942.  H. S. JOHNS  2,284,977
PARKING METER
Filed Aug. 19, 1937   13 Sheets-Sheet 1
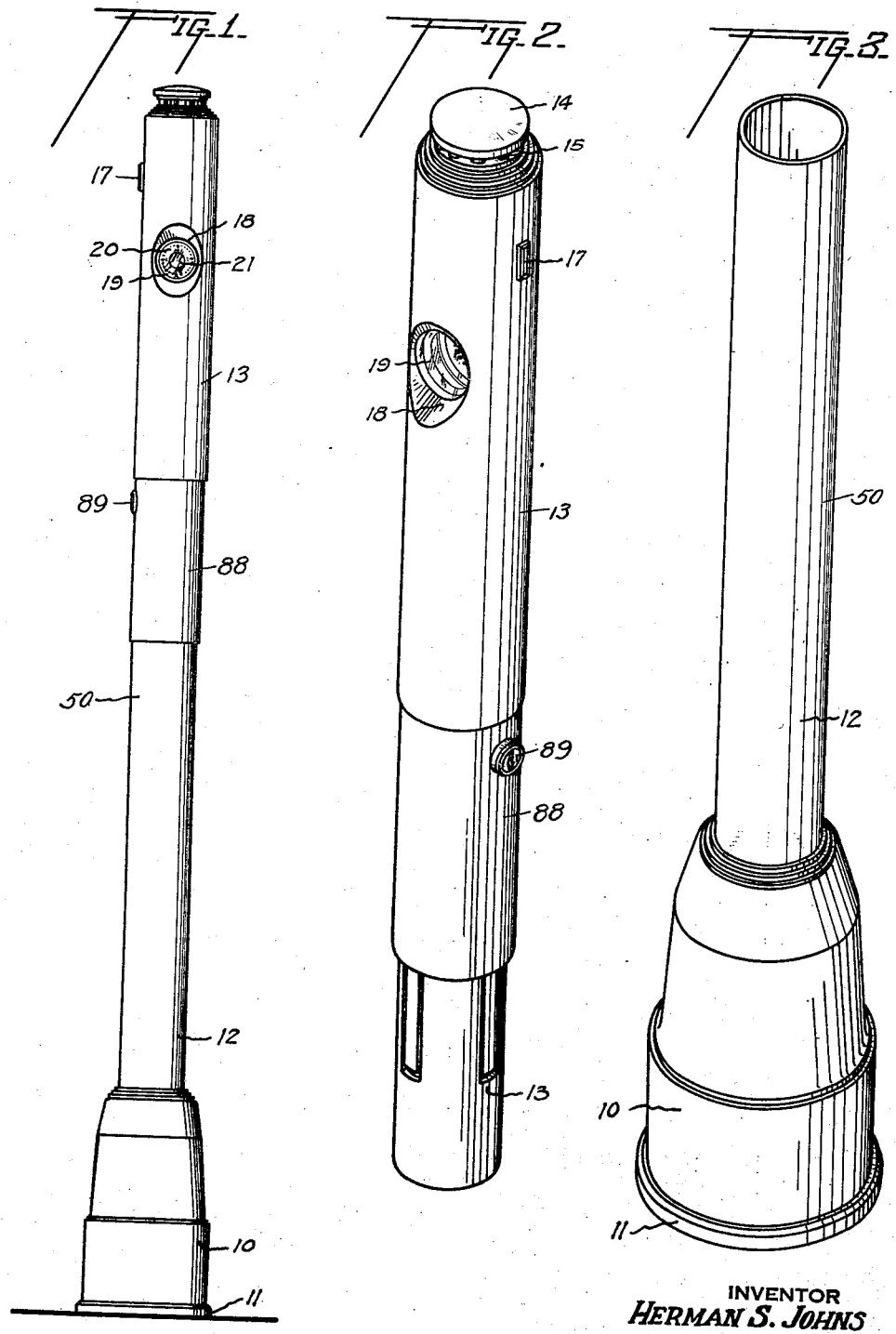
INVENTOR
HERMAN S. JOHNS
BY
Jack Ashley
ATTORNEY

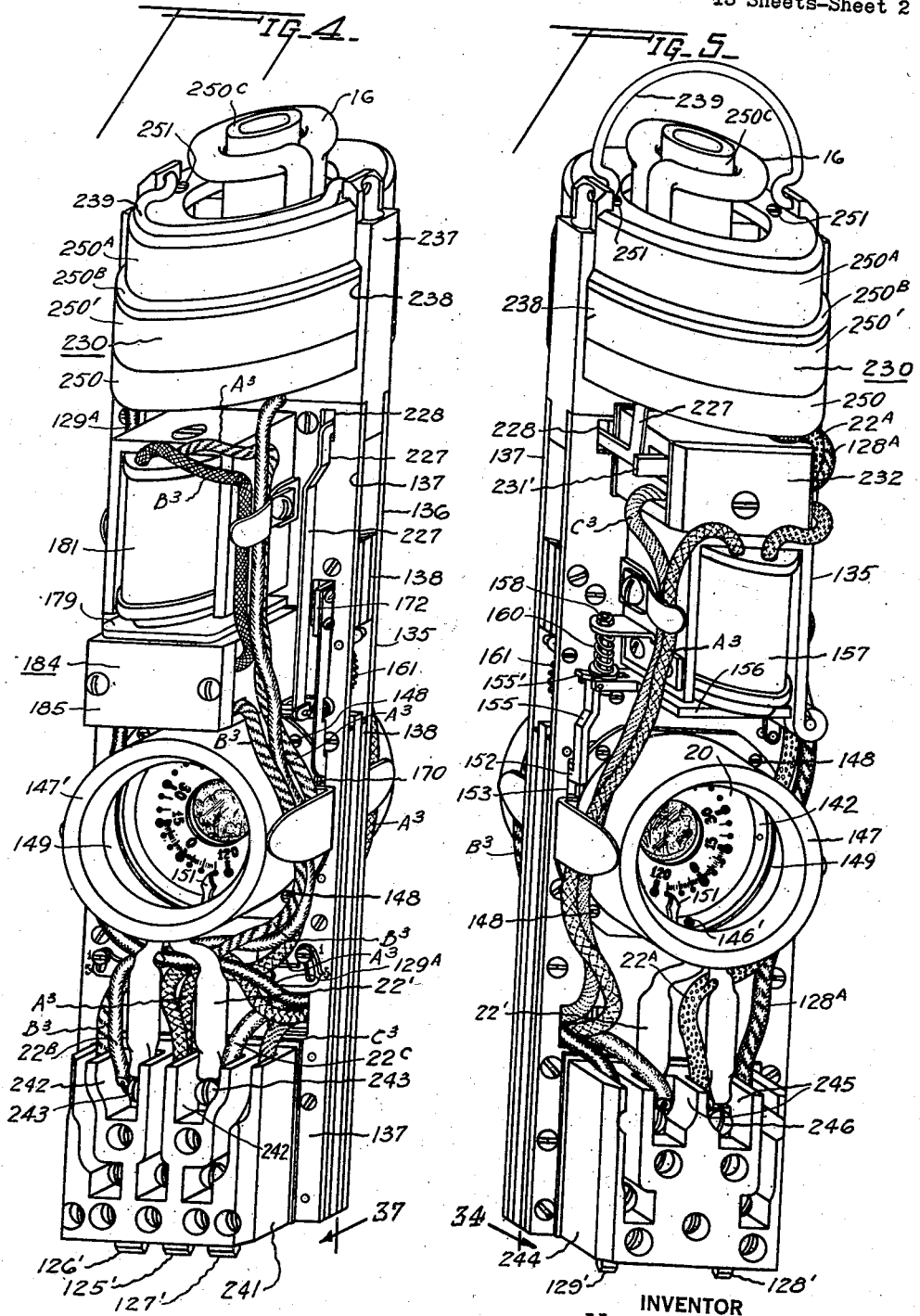

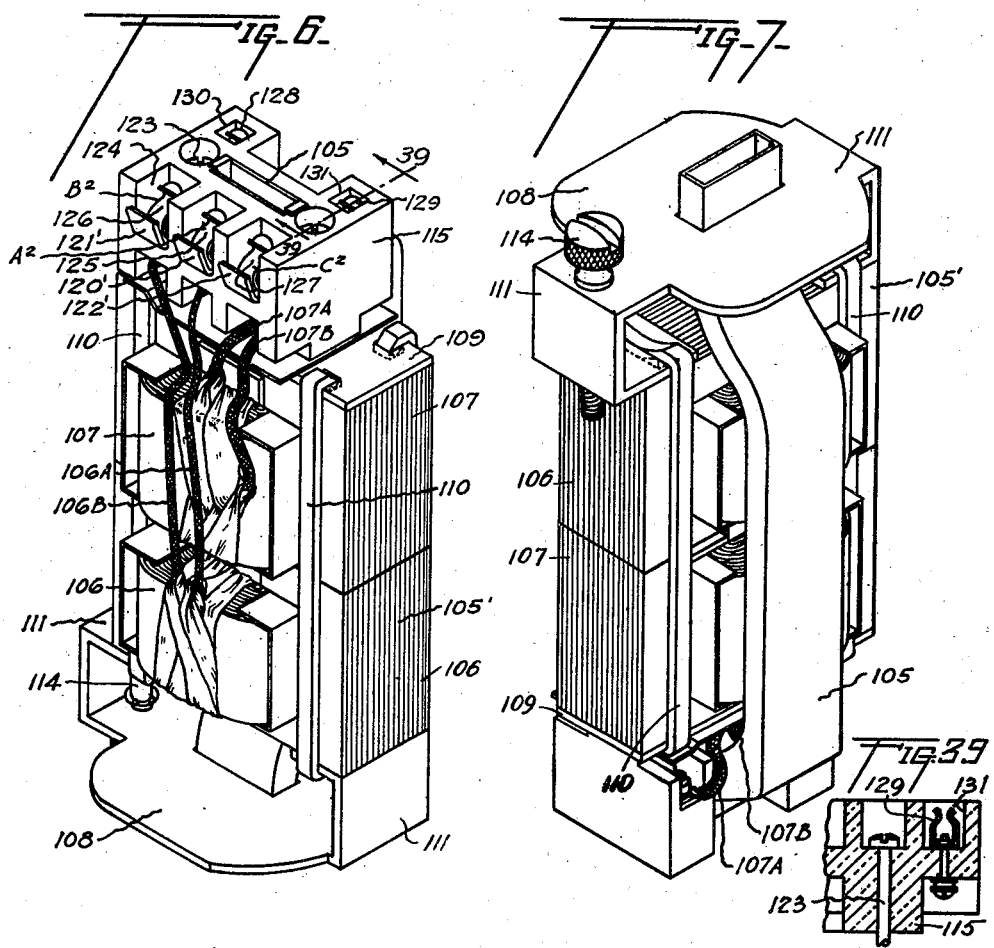

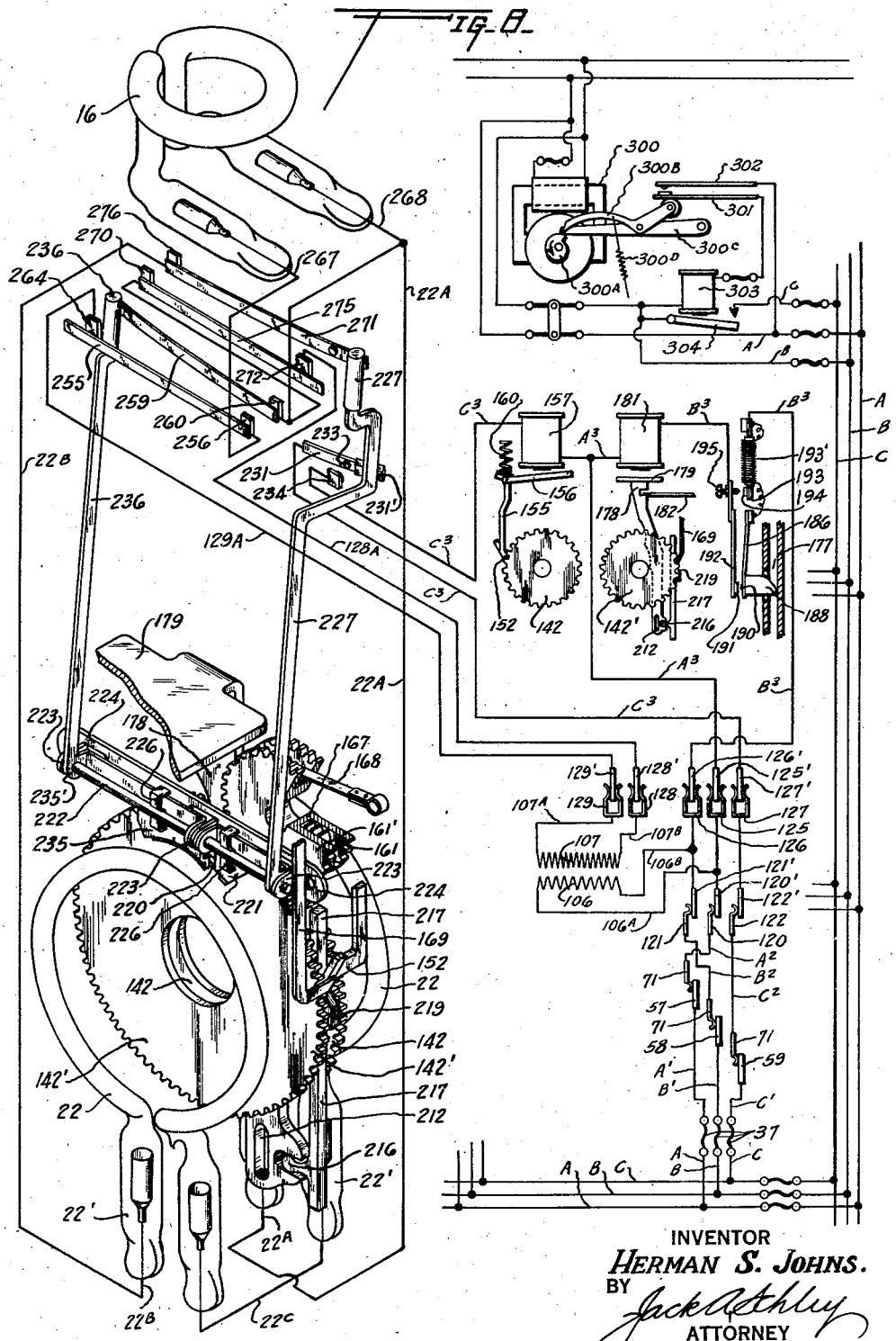

June 2, 1942.    H. S. JOHNS    2,284,977
PARKING METER
Filed Aug. 19, 1937    13 Sheets-Sheet 5
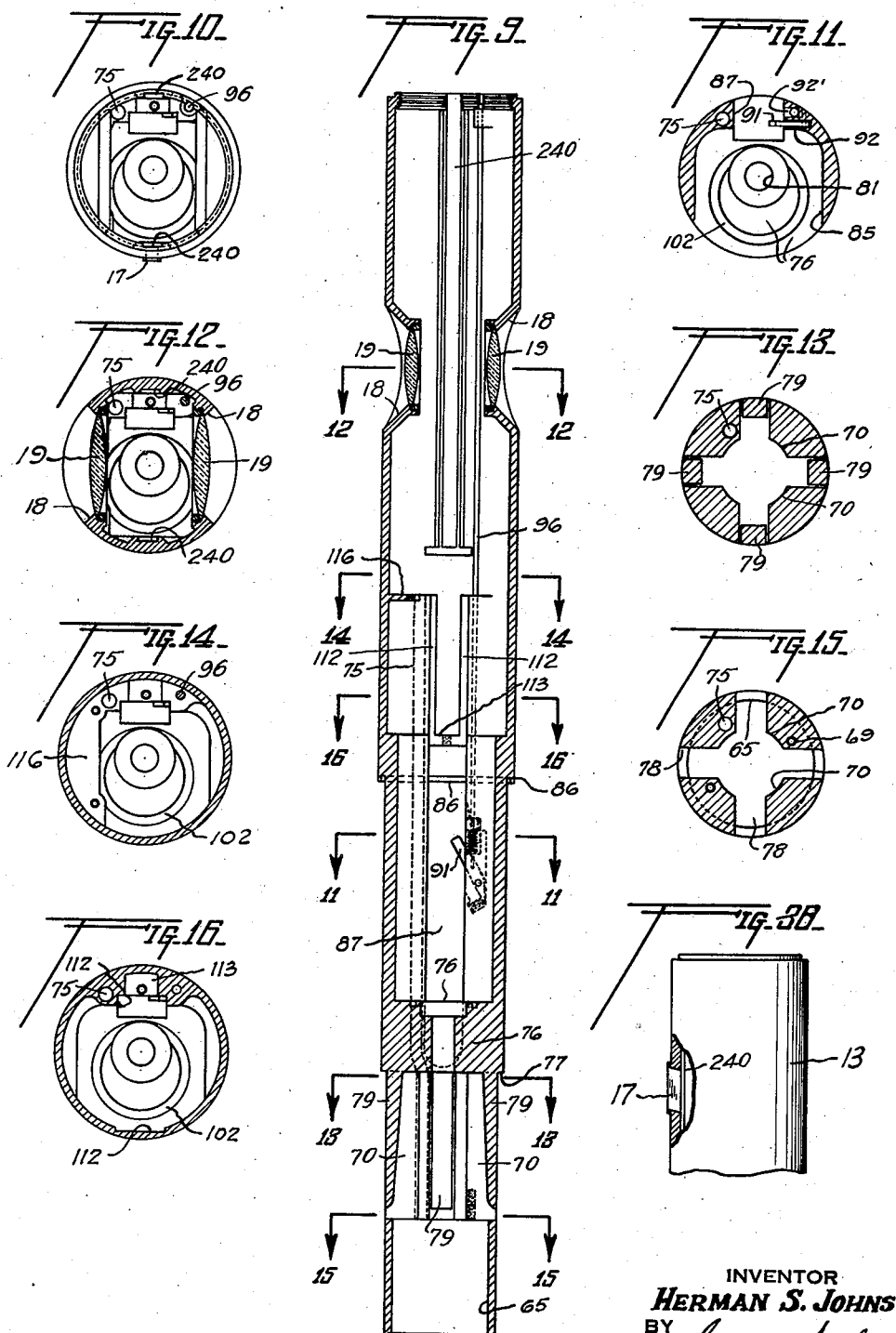
INVENTOR
*HERMAN S. JOHNS*
BY
*Jack A. Ashley*
ATTORNEY June 2, 1942.  H. S. JOHNS  2,284,977
PARKING METER
Filed Aug. 19, 1937  13 Sheets-Sheet 6
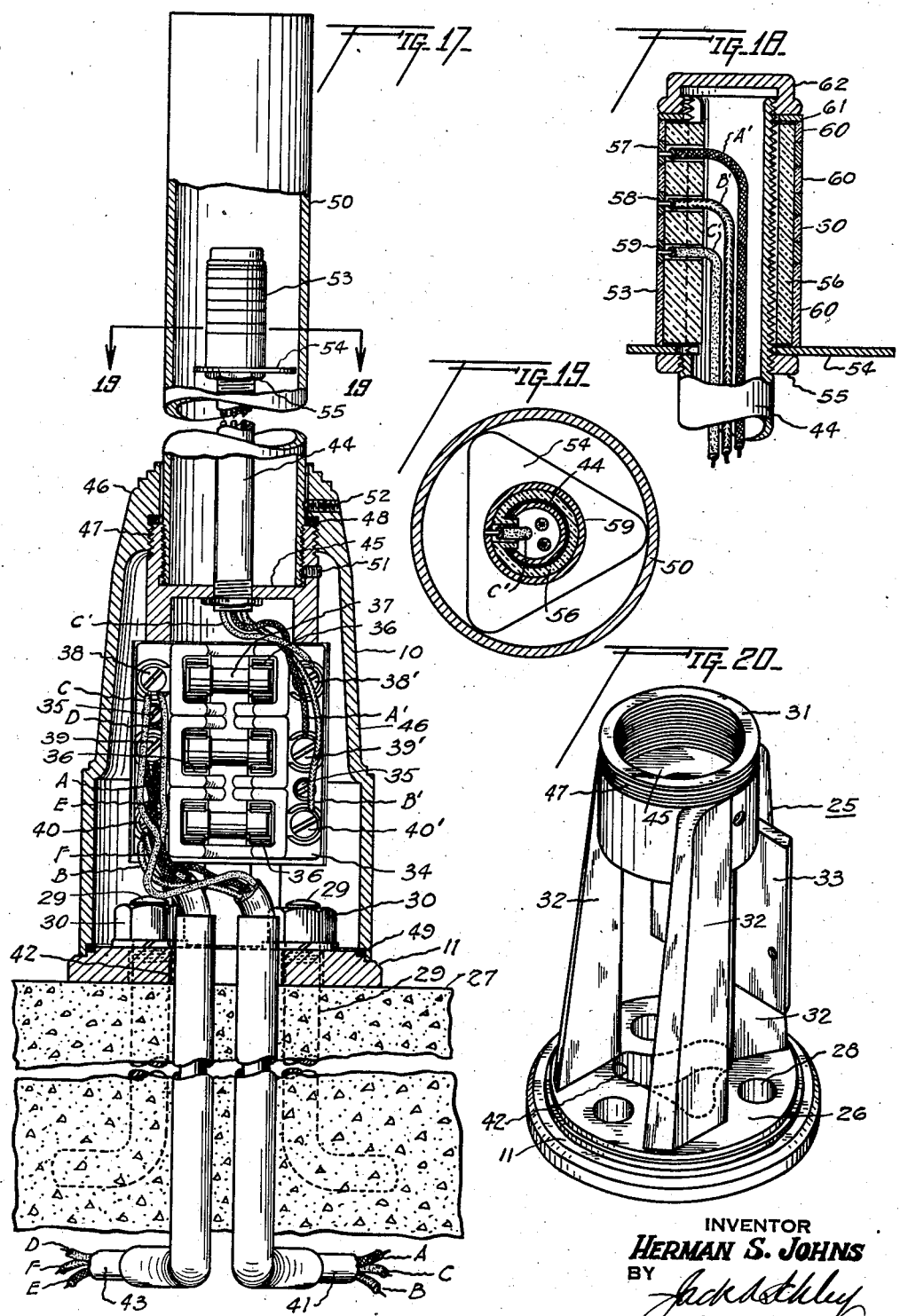
INVENTOR
HERMAN S. JOHNS
BY
Jack Ashley
ATTORNEY

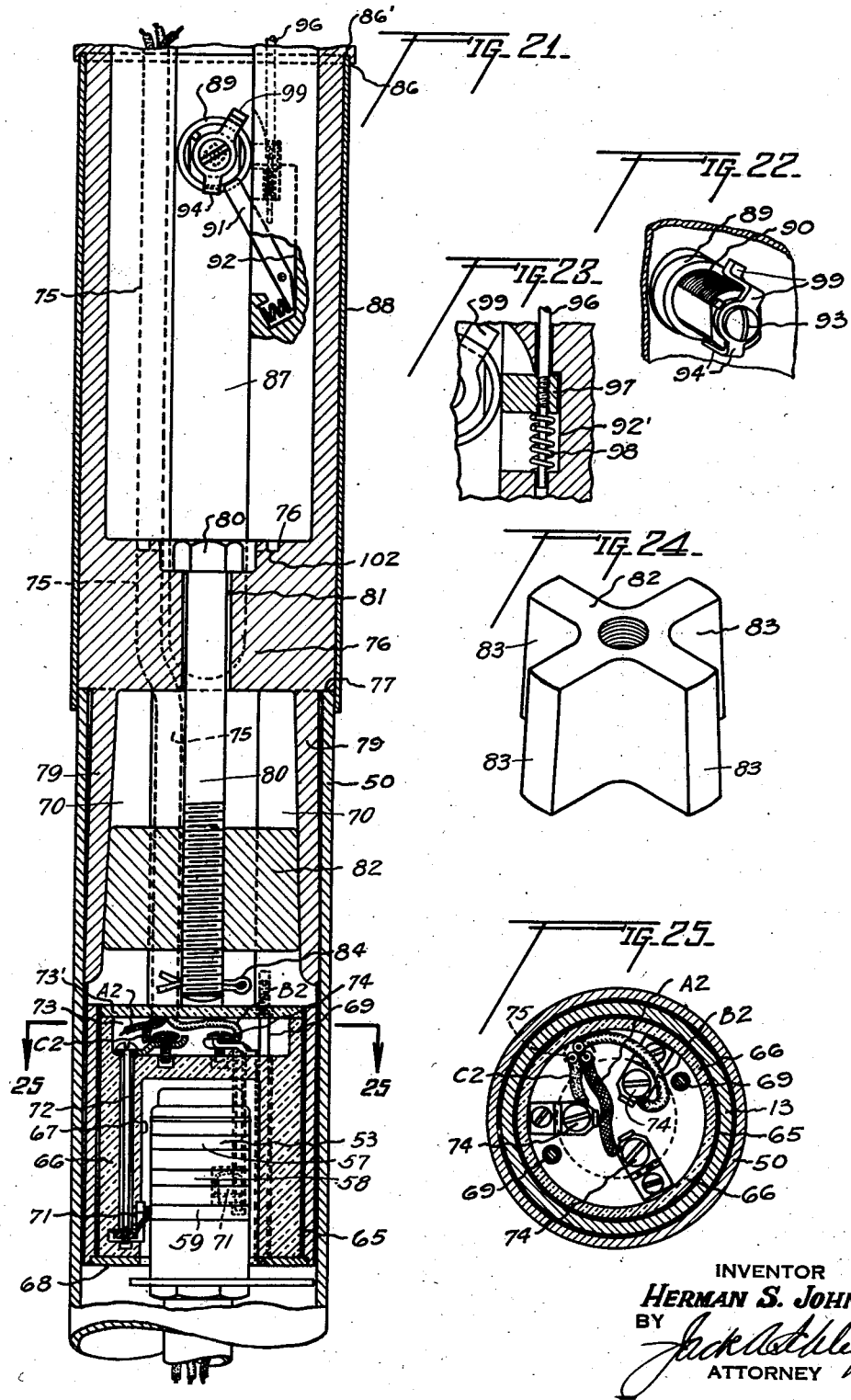

June 2, 1942.  H. S. JOHNS  2,284,977
PARKING METER
Filed Aug. 19, 1937   13 Sheets-Sheet 8
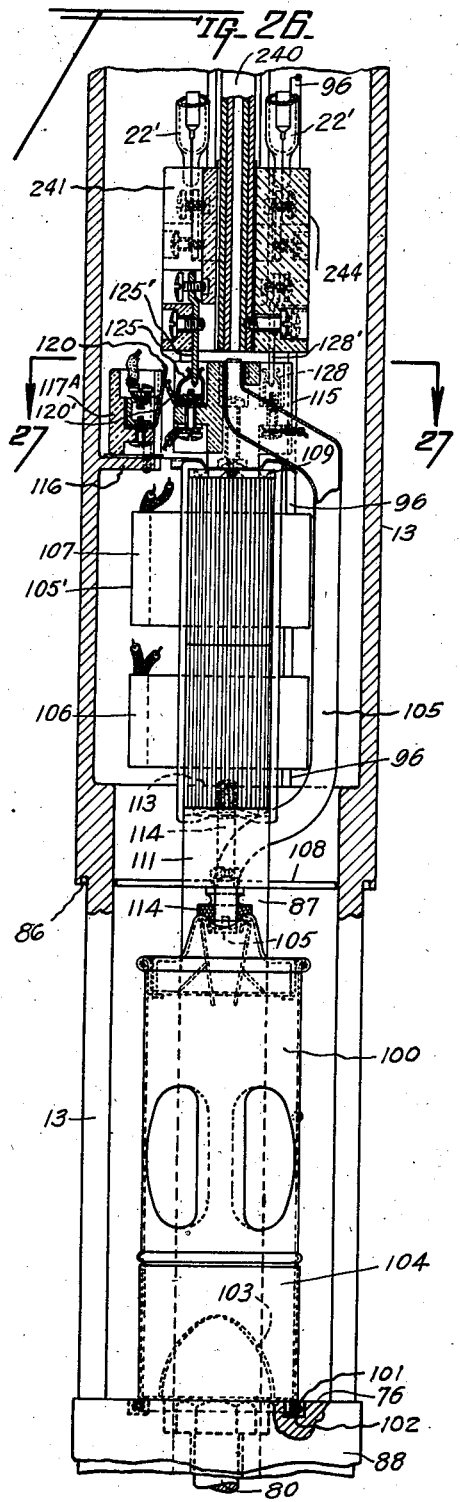
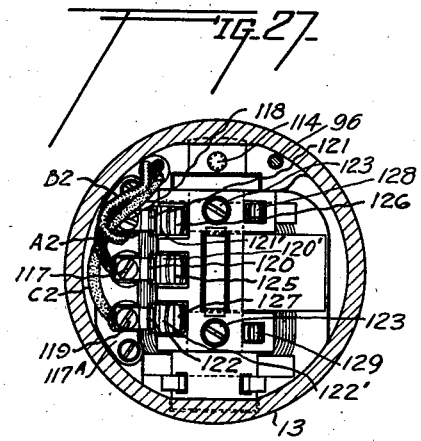
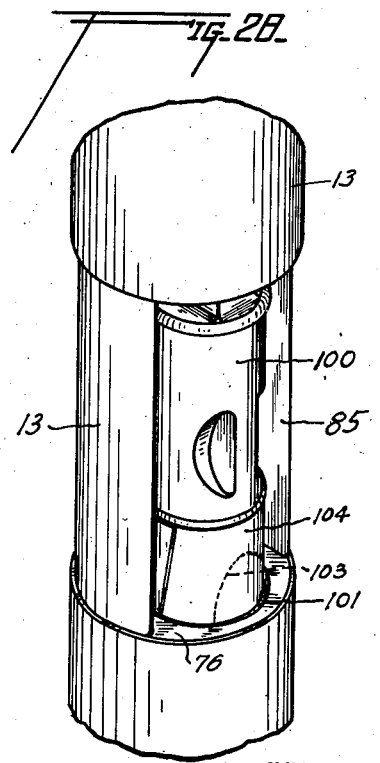
INVENTOR
*Herman S. Johns*
BY
*Jack Astley*
ATTORNEY June 2, 1942.　　　H. S. JOHNS　　　2,284,977
PARKING METER
Filed Aug. 19, 1937　　13 Sheets-Sheet 9
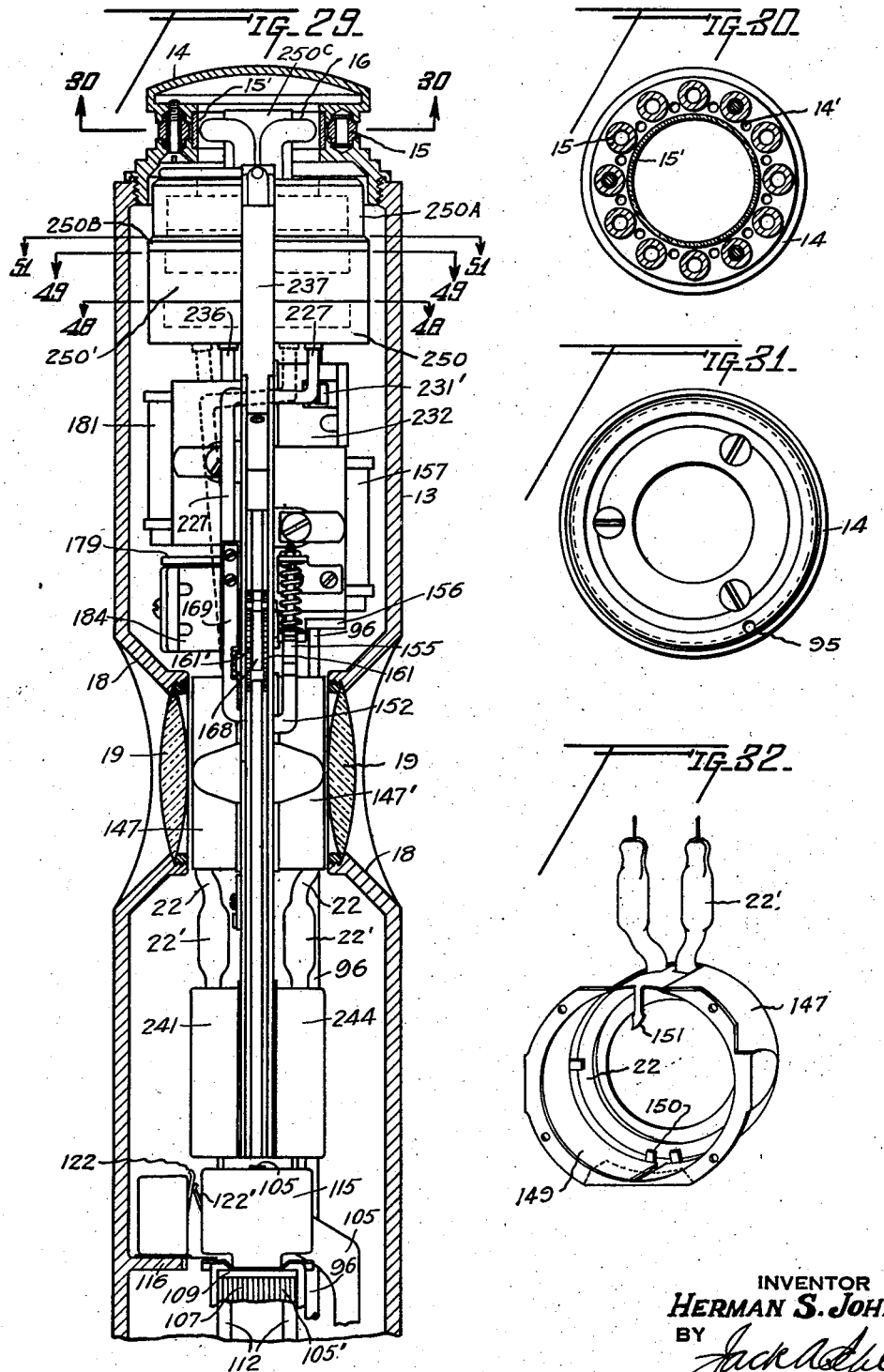
INVENTOR
HERMAN S. JOHNS
BY
Jack A. Ehley
ATTORNEY

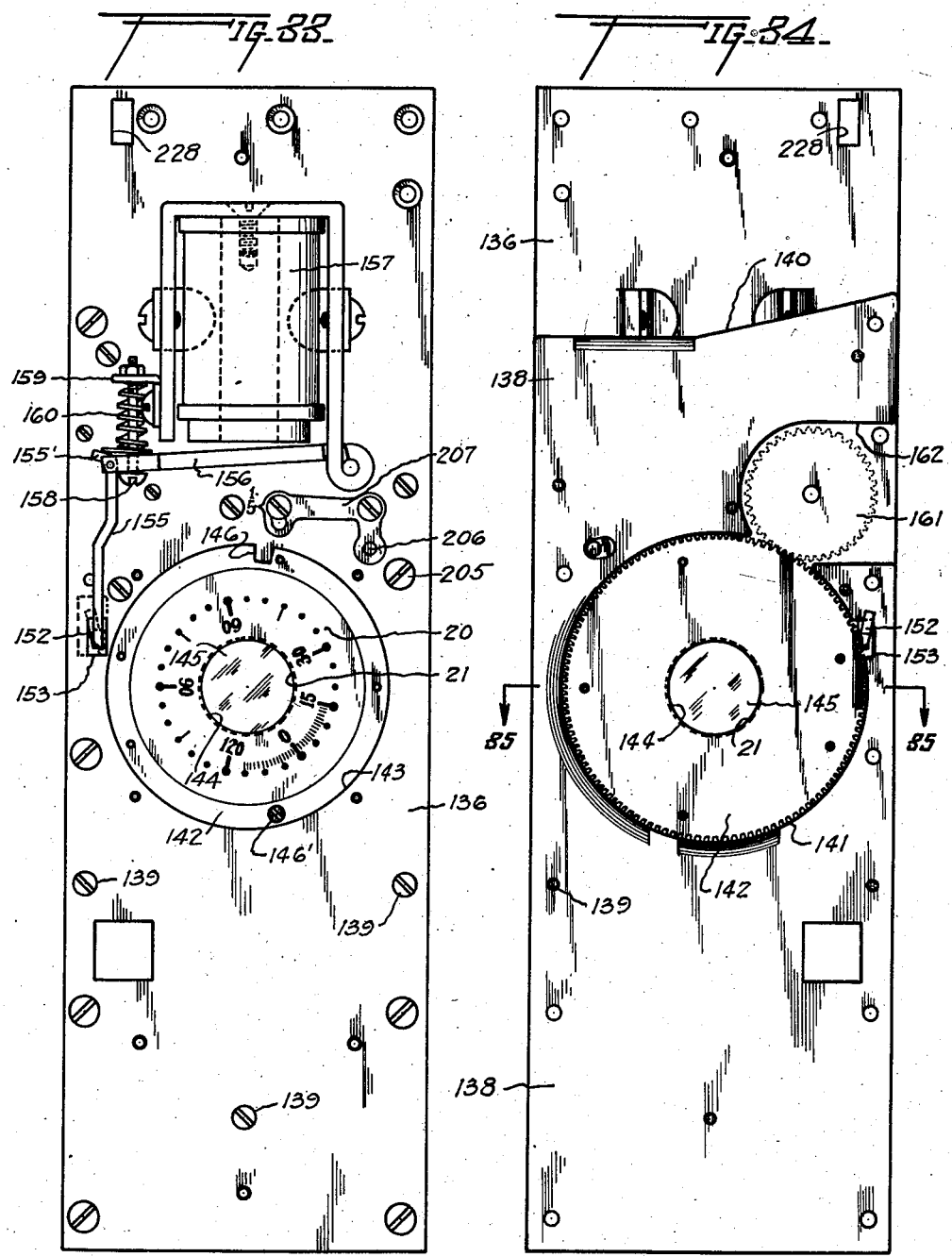

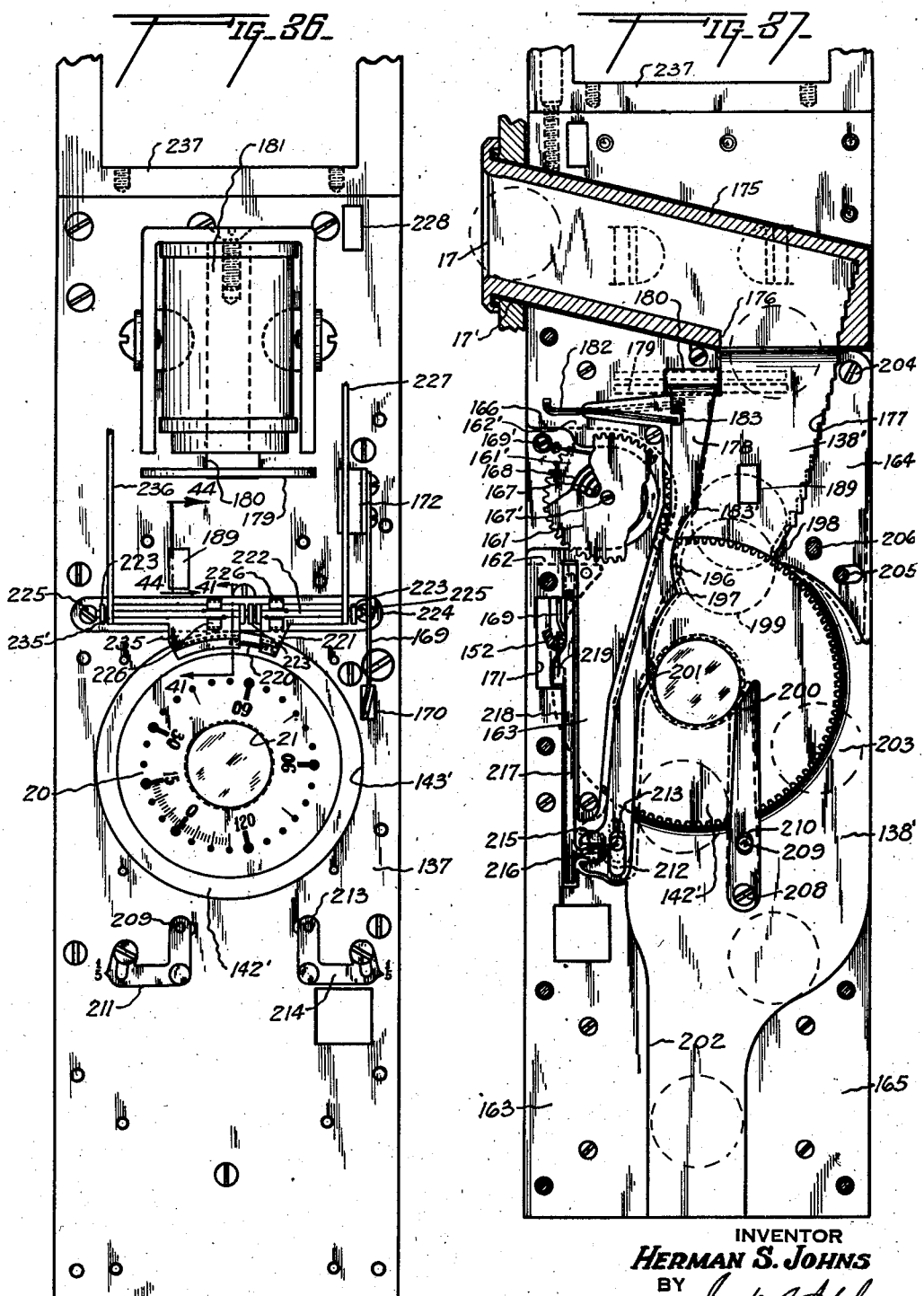

June 2, 1942.　　　　H. S. JOHNS　　　　2,284,977
PARKING METER
Filed Aug. 19, 1937　　　　13 Sheets-Sheet 12
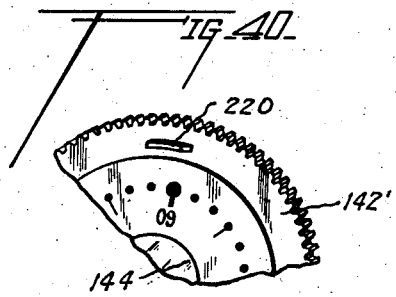
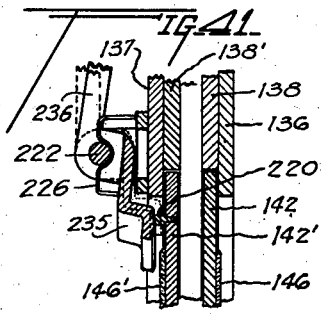
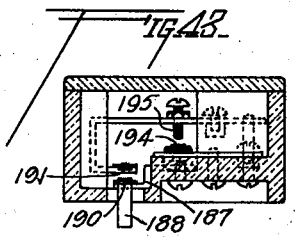
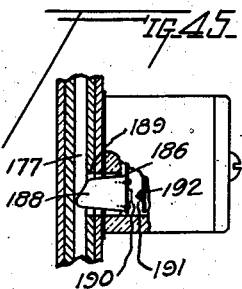
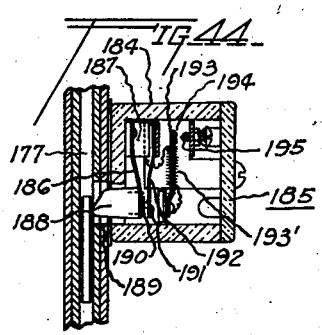
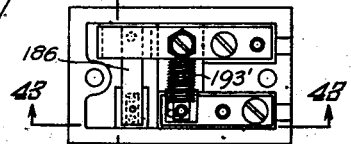
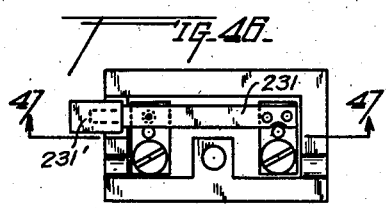
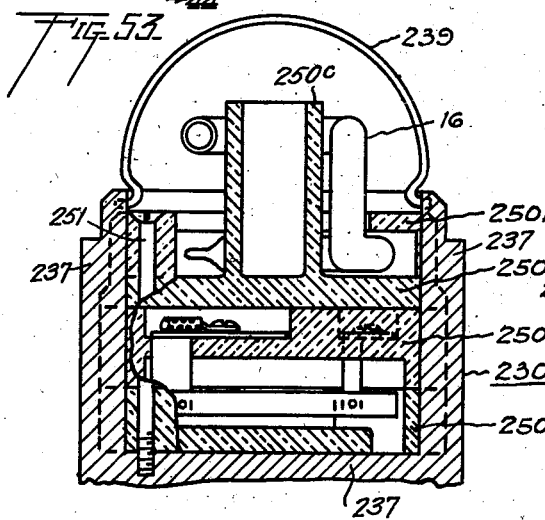
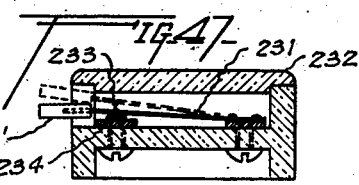
INVENTOR
*HERMAN S. JOHNS*
BY
ATTORNEY

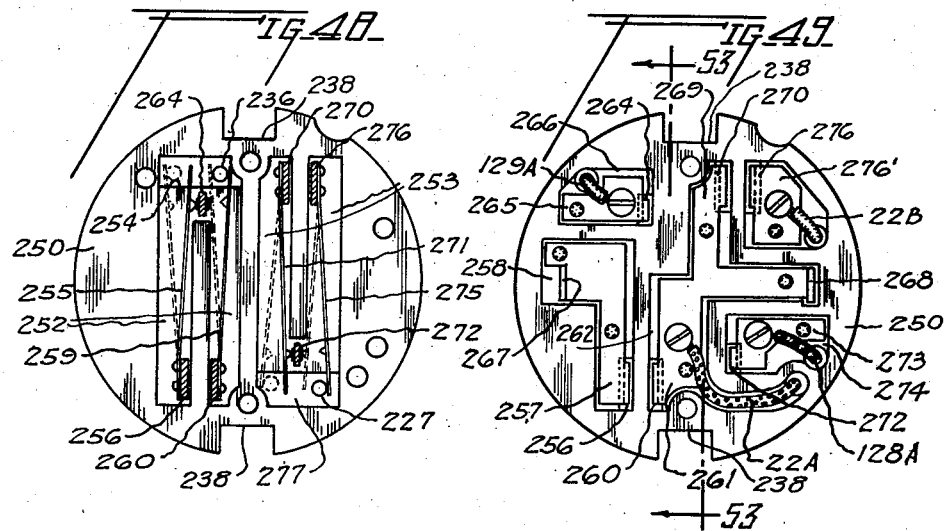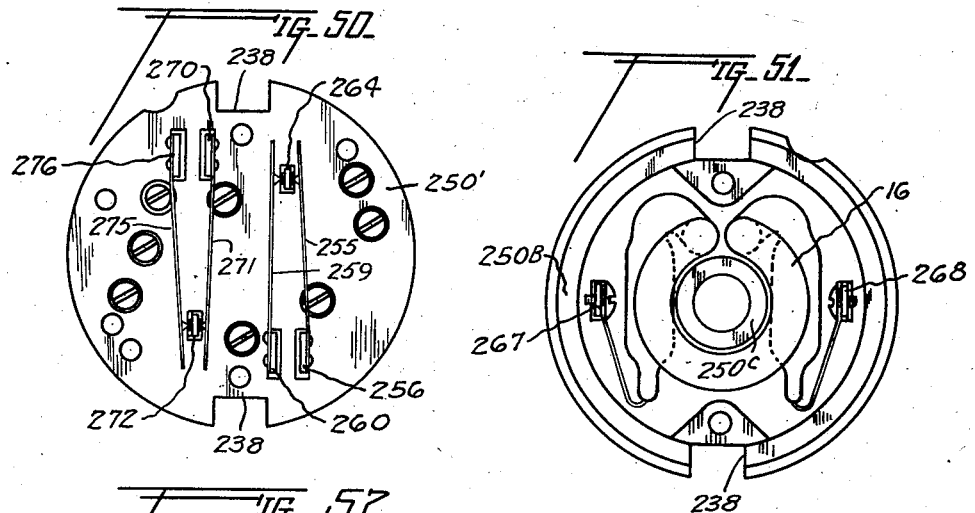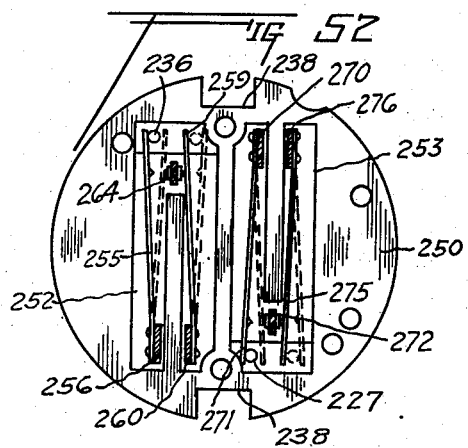

Patented June 2, 1942

2,284,977

UNITED STATES PATENT OFFICE 2,284,977

PARKING METER

Herman S. Johns, Oklahoma City, Okla., assignor to Wiley W. Lowrey, Oklahoma City, Okla.

Application August 19, 1937, Serial No. 159,934

31 Claims. (Cl. 194—9)

This invention relates to new and useful improvements in parking meters.

In recent years, many larger cities throughout the country have installed parking meters on their streets to control the parking problem in congested business districts. The payment of a nominal sum by the motorist entitles him to park his vehicle in a designated place for a predetermined length of time, after which he must deposit another coin or relinquish his parking place. The primary purpose of the parking meter was to discourage the practice of one motorist occupying a particular parking place for several hours at a time, whereby several motorists could utilize the same space at different periods throughout the day, thereby resulting in a constant movement or replacement of the parked vehicles. By charging the motorist a nominal sum for parking privileges, parking for long periods in one place is discouraged, with a resultant relief of congested conditions due to lack of parking space.

Further, the parking meter is not intended to provide a revenue medium but is a means whereby the individual motorist can indicate the exact time when his vehicle is parked, which relieves the police officer, or other city employee, from constantly watching each parking space. Therefore, the officer need only check the meters to determine the vehicles which are parked overtime. The revenue derived from the meters is intended to be only sufficient to cover the original cost and servicing of the meters and the revenue can be readily controlled by varying the coin necessary to operate the meter.

In order for the parking meter to fully accomplish its purpose, it is essential that the meter be constructed so that the police officer may readily determine whether a coin has been deposited and also that he may readily ascertain when the allowed time has expired. As is well known, the usual type of parking meter employs a stationary dial over which an indicator travels. The indicator is operated by a clock mechanism so as to travel over the entire dial during the allotted time and when the indicator has completed its movement, the time paid for is expired. The only way in which it is possible to determine when the time is expired is to look at the indicator, which is comparatively small and cannot be seen from any great distance. Further, the disposition of the dial and indicator is such that when viewed from an angle, the indication is not clearly visible and therefore, the police officer, or other official, as well as the motorist, must observe the dial and indicator from a point directly opposite the meter in order to be absolutely sure of the indication.

In actual use, the parking meters are located throughout the length of the street and one police officer may be assigned several blocks. In order to accurately check the usual meter, now in general use, the officer must patrol his entire area and must pass each meter in order to read the indication. If he is covering several blocks, his entire time is taken up checking the various meters and unless an accurate check is maintained, the motorist may occupy a particular space for an excessive period of time thereby defeating the purpose of the meter.

Further, the majority of the present type of meters have no means for indicating an overtime period after the parking period has expired and therefore, a motorist may remain in the vehicle parked within the space after the indicator has traversed the dial. It may be thirty or forty minutes before the officer checking the meter passes the same and upon calling the attention of the motorist to the expiration of the time, said motorist may state, without contradiction, that the indicator had just completed its movement. This permits the motorist to obtain additional parking time which tends to further defeat the purpose of the meter.

Most of the present meters now in use employ a clock mechanism therein, which requires constant attention and maintenance to assure its accuracy; also, the construction is such that the working parts are difficult to reach for replacement or repair and the meter must be substantially disassembled and placed out of use to permit any work to be done thereto.

It is, therefore, one of the objects of the invention to provide a parking meter which will overcome all of the above disadvantages as well as other objections, present in the parking meters now in use.

Another object of the invention is to provide an improved parking meter having an illuminated signal which is clearly visible from a distance and which is lighted when the paid parking time has expired, said signal remaining lighted until another coin is deposited; the visibility of the signal permitting an officer, or other observer, to instantly determine from a distance, which vehicles are parked overtime in their respective places.

An important object of the invention is to provide a parking meter having a window or windows through which the indicating mechanism and the coin which has been deposited, is visible, with means for illuminating the window or windows when the coin is deposited, said window or windows remaining illuminated throughout the parking period, whereby the illumination not only indicates that the parking time has been properly paid for but also makes the coin clearly visible.

Still another object of the invention is to provide an improved parking meter having an illuminated signal for indicating that the parking period is paid for and a second illuminated signal for designating "overtime," the signals being arranged so that when a coin is inserted, the "overtime" signal is extinguished and the other signal is lighted; the latter remaining lighted throughout the parking period and for a short space thereafter, while the overtime signal remains unlighted until the parking period has expired, at which time it is again illuminated. The illumination of the overtime signal at the end of the paid for parking period causing both signals to be lighted at the same time for a limited time immediately after the parking period has expired to indicate that such period has just expired; after the expiration of such limited time, the overtime signal remains lighted while the other signal is extinguished to indicate that the parking period has elapsed some time before, the overtime signal remaining lighted until the insertion of another coin after which the cycle is repeated. The arrangement of the signals in the above manner definitely advise the observer as to when the parking period expires and precludes any possibility of a motorist stating that the period has just expired, when in reality it had lapsed twenty or thirty minutes previous.

A further object of the invention is to provide an improved parking meter of the character described wherein neon tubing may be employed for illumination, whereby the signals are clearly visible during the day time, the meter also having a recessed window through which the dial and coin are visible, whereby the sun rays, shadows, or reflections do not affect the visibility of said dial and coin.

A particular object of the invention is to provide an improved parking meter including an elongate tubular housing wherein the entire mechanism is located, the mechanism being constructed in units, whereby removal of any one of said units for repair or replacement may be readily accomplished, which facilitates the upkeep and maintenance of the meter.

Still another object of the invention is to provide a parking meter which has its dial mechanism electrically operated by a time impulse whereby accuracy of the recording is assured and the operation is not affected by weather or other conditions; the construction of the meter being such that it may be electrically connected to a single source of time impulse along with all the other meters, so that all the meters are actuated by the single impulse; there being means provided with said meter for electrically disconnecting said meter from the impulse when the meter is not in use and a coin has not been deposited therein, such disconnection of the meter having no effect on the operation of the other meters in the circuit.

A still further object of the invention is to provide a parking meter which is durable in construction and attractive in appearance and which has a coin container therein with means for preventing access to the container adapted to be locked by an improved locking mechanism; the locking mechanism not only locking the coin container protective means but also acting to lock the parts of the meter together to prevent dis-assembly of said meter; said locking mechanism being constructed so that it may release the parts of the meter without permitting access to the coin container.

Still another object of the invention is to provide an improved coin receiving mechanism for a parking meter which is arranged to actuate the various signals and recording means of the meter when the coin is deposited therein, and having means for holding the coin within an opening so as to be visible until the next coin is deposited; said mechanism being readily adjustable so as to accommodate various size coins.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a parking meter, constructed in accordance with the invention, Figure 2 is a perspective view of the upper portion of said meter removed from the base, Figure 3 is a perspective view of the base, Figure 4 is a perspective view of the coin receiving and dial unit, Figure 5 is a similar view of the side opposite that shown in Figure 4, Figure 6 is an isometric view of the transformer unit, Figure 7 is a view, similar to Figure 6 with the transformer unit turned over and having its lower end uppermost, Figure 8 is a wiring diagram illustrating the various parts of the device schematically so as to more clearly show the electrical apparatus and its operation, Figure 9 is a transverse, vertical sectional view of the upper portion of the meter housing or casing, with all of the mechanism removed therefrom, Figure 10 is a plan view of the casing as shown in Figure 9, Figures 11 to 16 are horizontal, cross-sectional views, taken on their respective lines on Figure 9, Figure 17 is a view, partly in elevation and partly in section of the base of the meter, Figure 18 is an enlarged, transverse, vertical sectional view of the contact member within said base, Figure 19 is a horizontal, cross-sectional view, taken on the line 19—19 of Figure 17, Figure 20 is a perspective view of the base member with its outer shell removed, Figure 21 is an enlarged transverse, vertical, sectional view showing the connection between the upper portion of the meter housing with the base, Figure 22 is a perspective detail of the lock, Figure 23 is a perspective view of the lower end of the locking rod, Figure 24 is an isometric view of the wedge block which fastens the base to the upper portion of the meter housing, Figure 25 is a horizontal, cross-sectional view, taken on the line 25—25 of Figure 21, Figure 26 is an enlarged, transverse, vertical, sectional view of that portion of the meter housing wherein the transformer unit and the coin container are mounted, Figure 27 is a horizontal, cross-sectional view, taken on the line 27—27 of Figure 26, Figure 28 is a perspective view of the coin container, Figure 29 is an enlarged, transverse, vertical sectional view of the upper portion of the meter housing with the coin receiving and dial unit mounted therein, Figure 30 is a horizontal, cross-sectional view, taken on the line 30—30 of Figure 29, Figure 31 is a bottom view of the cap which closes the top of the meter housing, Figure 32 is a perspective view of the inner side of the circular dial casing, Figure 33 is an enlarged elevation of one side of the coin receiving unit, Figure 34 is an elevation of the inner side of the side plate shown in Figure 33, with the inner plate secured thereto, and taken on the line 34 of Figure 5, Figure 35 is a horizontal, cross-sectional view, taken on the line 35 of Figure 34, Figure 36 is a view similar to Figure 33 showing the opposite side of the unit, Figure 37 is a vertical, sectional view, taken on the line 37 of Figure 4, and showing the spacer members in elevation, Figure 38 is a view partly in section and partly in elevation, showing the slot in the housing which receives the outer end of the coin chute, Figure 39 is an enlarged sectional detail, taken on the line 39—39 of Figure 6, Figure 40 is an enlarged, partial elevation of one of the dial gears, Figure 41 is a vertical sectional view, taken on the line 41 in Figure 36, Figure 42 is an elevation of the coin release and resetting switch, with its cover removed, Figure 43 is a longitudinal sectional view, taken on the line 43—43 of Figure 42, Figure 44 is a transverse, sectional view, taken on the line 44—44 of Figure 42 and on the line 44 of Figure 36, Figure 45 is a view, partly in section and partly in elevation of said switch, Figure 46 is an elevation of the control switch connected in the impulse circuit with its cover removed, Figure 47 is a sectional view, taken on the line 47—47 of Figure 46, Figure 48 is a horizontal, cross-sectional view, taken on the line 48—48 of Figure 29, Figure 49 is a horizontal, cross-sectional view, taken on the line 49—49 of Figure 29, Figure 50 is a view of the underside of Figure 49 with the switch arms mounted thereon, Figure 51 is a horizontal, cross-sectional view taken on the line 51—51 of Figure 29, Figure 52 is a view similar to Figure 48, showing another position of the switches, and Figure 53 is a transverse, vertical, sectional view taken through the switch housing.

In the drawings (Figures 1, 2 and 3) the numeral 10 designates a base unit which has an annular flange 11 at its lower end. The base is suitably anchored to the ground surface adjacent a vehicle parking space, as will be explained. The upper end of the base is cylindrical as shown at 12 and is adapted to receive the lower end of an elongate tubular housing or post 13, which houses the major portion of the operating mechanism. The upper end of the housing or post is closed by a cap 14, which is threaded thereinto. (Figures 29 and 30.) The top of the cap 14 is spaced from the remainder thereof by a plurality of pins 15, whereby radial openings are formed in said cap. The specific details of the cap will be hereinafter set forth. A neon tube 16 is located within the cap and when illuminated, is visible from any direction.

A coin slot 17 is located in the wall of the housing or post 13 near the upper end thereof, while recessed openings 18 are provided in said housing below the slot. The openings are located diametrically opposite each other and have a magnifying lens 19 covering the same. An indicating dial 20 is visible through each opening and the dials are formed with a central aperture 21 (Figures 29, 33 and 36) whereby a coin deposited in the coin slot 17 may fall between the dials and be retained therebetween so as to be visible through said apertures. Since the recessed openings 18 are located diametrically opposite each other in the housing, it will be manifest that one of said openings may be directed outwardly so as to be visible from the street, which would dispose the other opening in full view of an observer on the sidewalk.

To illuminate the dials 20 and the coin therebetween so as to make the same visible, a neon tube 22 (Figure 32) surrounds each opening 18, being mounted within the housing so as to indirectly light the parts visible through the openings. The tubes 22 which illuminate the dials 20 are preferably of a different color than the tube 16 located in the cap 14 and for the purpose of this description, it will be assumed that the tube 16 is red in color, while the tubes 22 are blue; however, it is noted that the tubes may be of any desired color and also lights, such as bulbs or lamps other than the luminous tubes shown could be employed. The neon tubes are preferable because of their visibility in the daytime.

The housing or post 13 as well as the base unit 10, is constructed of any suitable metal and if desired, the post may be painted or enameled to make the same more attractive. The device is mounted adjacent the parking space and is usually anchored in the sidewalk contiguous to the curb stone. The arrangement of the red light 16 within the cap 14 permits its being observed from any direction or angle while the location of the openings 18 is such that the dials 20 are visible from either the street or sidewalk. It is believed that a brief description of the operation of the meter will clarify the purposes and objects and therefore, the particular means employed for performing the functions will be subsequently described.

One of the devices is, of course, mounted adjacent each parking space throughout the length of the street and all of the devices are controlled from a single master control. Since the meters are used only during the daytime as for example, from 7 a. m. to 6 p. m. the meters would not be in operation during the remainder of the day and night. When the meters are placed in condition for operation through the master control, the red tube 16 would be illuminated immediately to indicate that the meter is in operation but that the parking space governed by such meter had not been paid for since no coin has been inserted. At this time, the blue tubes 22 are not lighted and the dial, although visible, is not illuminated.

When the motorist occupies the parking space with his vehicle, he deposits a coin in the coin slot 17. This coin falls downwardly between the dials 20 and as it does so it operates a switch (as will be explained) to extinguish the red signal 16 and light the blue tubes 22 simultaneously. The coin is retained between the dials 20 and is clearly visible through the apertures 21 in the dials. The blue light illuminates the dials and coin and the magnifying lens 19 makes said dials and coin clearly visible from a distance. The dials 20 begin to rotate upon insertion of the coin, whereby the time begins registering immediately. Throughout the time allowed or throughout the parking period, the blue tubes 22 are lighted to illuminate the dials 20 and coin while the red tube 16 at the top of the meter is extinguished.

With such arrangement, the observer can ascertain at a glance whether or not the parking space has been properly paid for. The illumination of the dials and coin not only increases the visibility of these parts, but also the light itself is a signal which indicates that the proper coin has been deposited. Thus, a police officer can observe the meters in an entire block from one point and can immediately tell which parking spaces are unlawfully occupied. If the red signal 16 is illuminated and a vehicle is occupying the parking space adjacent thereto, the observer immediately knows that the space has not been paid for. This eliminates the necessity of the officer walking to each meter to determine whether any car is occupying a space without payment.

After the time has expired on the meter, as indicated by the dials 20, the red tube 16 is again lighted to indicate that the vehicle is parked overtime in the space. The blue tubes 22 are not immediately extinguished when the red tube 16 is lighted, but said tubes remain illuminated for a predetermined period of several minutes, for example, five. Therefore, as soon as the paid for time expires both red and blue tubes are illuminated for a short period to indicate that the time has just expired. When the observer sees that both red and blue tubes are lighted he immediately knows that the period has expired.

After a lapse of the short predetermined period after the expiration of the parking time, the blue tubes 22 are extinguished leaving only the red tube 16 lighted. This clearly indicates that the vehicle is overtime in its space and that sufficient time for its removal or the insertion of another coin since the expiration of the parking time, has been available. Thus, the motorist cannot say that the time had just expired and he did not have time to move his vehicle or to deposit another coin. All argument as to when the time expired is precluded and the employment of the signals permits the officer on duty to instantly determine the condition of the meter and the type of coin, thereby permitting a patrol of the meters by an officer in a moving vehicle.

Assuming that the motorist has moved his vehicle after the time has expired, the red tube 16 is again lighted and will remain so until the next motorist deposits a coin, at which time the coin between the dials 20 which has been previously deposited is released, and the last coin inserted moves into place between said dials. The insertion of the last coin will extinguish the red tube 16 and will illuminate the blue tubes 22 whereby the cycle above described is repeated.

*The base unit*

Referring to Figures 17 to 20 which illustrate the details of the base unit, it will be seen that such unit includes an inner support 25 having a base plate 26 which rests on the concrete sidewalk or other support 27. The plate is formed with openings 28 through which the upper ends of anchor bolts 29 embedded in the concrete, extend. Nuts 30 on the ends of said bolts securely fasten the plate in position.

The inner support 25 has a collar 31 at its upper end and this collar is connected to the plate 26 by vertical webs or ribs 32, three of which are provided as is clearly shown in Figure 20. A vertically disposed transverse plate 33 is secured to the inner face of one of the ribs 32 being preferably integral therewith and a three gang fuse block 34 is secured to the plate by screws 35. The fuse block or receptacle includes three pairs of fuse clips 36 which are mounted one above the other and the usual tubular link fuses 37 are supported between the clips. The uppermost pair of clips is electrically connected with terminals 38 and 38', the second pair of clips is connected to terminals 39 and 39', while the lowermost pair is connected to terminals 40 and 40', all of said terminals being mounted in the fuse block or base 34.

Electrical lead wires A, B and C, which lead from a suitable source of electrical supply, are insulated from each other and are located within the usual insulating cable 41. The cable passes upwardly through a conduit in the concrete support 27 and through a central opening 42 in the base plate 26 into the base unit. The wire A is connected to the terminal 39 of the middle fuse, while the wire B is connected to the terminal 40 of the lowermost fuse, the wire C being connected to the terminal 38. Lead wires D, E and F are also connected to the terminals 38, 39 and 40 and are wrapped in a suitable insulating cable 43 which extends downwardly through the opening 42 in the base plate and through the concrete support 27, leading to the next parking meter (not shown). Thus, the electrical current flows through the wires A, B and C, then through the terminals 38, 39 and 40 and finally is conducted by the wires D, E and F to the next meter. The current from the wires A, B and C will, of course, flow through the fuses 37 to the terminals 38', 39' and 40'.

Leading from the terminal 38' which is fed by the wire C is a wire C' which extends upwardly through a vertical conduit 44. The conduit has its lower end mounted axially within a transverse web 45 which is disposed within the collar 31 of the inner support 25 of the base member. A wire A' leads from the terminal 39' which is fed by the wire A, and a wire B' leads from the terminal 40' which is fed by the wire B, both of the wires A' and B' entering the lower end of the conduit 44 along with the wire C'.

The inner support 25 of the base unit and the fuse block 34 and wires attached thereto are enclosed by a cylindrical shell 46 which has its upper end threaded onto external threads 47 formed on the collar 31. A suitable packing ring 48 is confined against the upper end of the collar in an annular groove provided in the shell to prevent water or other extraneous matter entering the shell. The lower end of the shell engages the flange 11 on the base plate 26 and a packing ring 49 is interposed between the shell and plate to prevent water seeping into the shell at this point.

A tubular extension or pipe 50 has its lower end threaded into the collar 31 and has its lower end abutting the transverse web 45 within said collar. A set screw 51 passes through the collar and engages the pipe to prevent unscrewing thereof and a similar set screw 52 extends through the upper end of the shell 46 and also engages said pipe to prevent unscrewing of said shell. The pipe or extension 50 projects upwardly for some distance, as is clearly shown in Figure 1.

The conduit 44 wherein the wires A', B' and C' are confined, extends axially through the extension 50 and terminates short of the upper end thereof. A contact head 53 is mounted on the upper end of the conduit and as clearly shown in Figure 18, this head is tubular and telescopes the upper end of the conduit. A triangular centering plate 54 is located beneath the head being held in place by a nut 55 and the outer edges of said plate engage the bore of the pipe or extension 50 to center the conduit within said pipe. The head includes a porcelain jacket 56 which has a trio of metallic contact rings 57, 58 and 59 encircling the same. Insulating spacer collars 60 preferably constructed of hard rubber, space and insulate the rings from each other. An annular retaining washer 61 overlies the porcelain jacket 56 and spacers 60 and a retaining cap 62 threaded onto the upper end of the conduit 44, holds the parts in position.

The wire A' which leads from the terminal 39' enters the tubular head and extends through a radial opening therein, whereby it may be connected to the uppermost contact ring 57. Similarly, the wire B' which leads from the terminal 40' is connected to the second ring 58, while the wire C' leading from the contact 38' is connected to the lowermost ring 59. Thus it will be seen that the electrical current is conducted from the source of supply through the wires A, B and C. The current must flow through the protective fuses 37 and is then carried through the wires A', B' and C' to the contact rings 57, 58 and 59 on the contact head. The head is located near the upper end of the extension whereby electrical connection therewith may be made when the tubular housing or post 13 which forms the upper portion of the meter is connected to the base unit 10. The wires A, B and C conduct the electrical current necessary for operating the mechanism, which will be hereinafter explained, to said mechanism. Obviously, the base unit is entirely complete in itself thereby allowing the remainder of the device to be separated therefrom to permit repair or servicing thereof.

The upper housing

The base unit 10 is adapted to receive the lower end of the upper housing or tubular post 13 and as is clearly shown in Figure 9, said housing is open at the top and bottom. The housing or post has a cylindrical outer surface at its lower end and is adapted to telescope the upper end of the extension or pipe 50 of the base unit. When the housing and base are secured together as will be explained, it is necessary that an electrical connection be made with the contact head 53, so that the electrical current from the rings 57, 58 and 59 of said head may be conducted therefrom.

For making the electrical connection, the lower end of the bore of the housing or post 13 is cylindrical in cross-section as shown at 65 in Figures 9 and 21. This portion of the bore receives a tubular sleeve member 66 which is preferably constructed of porcelain, or other electrical insulating material. The sleeve is formed with a central bore 67 which fits over and encloses the contact head 53 when the housing 13 and base are fastened together. The sleeve is retained within the lower end of the post or housing by a plate 68 which closes the bore 65 and is held in position therein by vertical bolts 69 which pass through the plate and sleeve and are engaged in the bottom of radial ribs 70 (Figures 13, 15 and 21) formed within the bore of the housing above the portion 65.

For electrically connecting the sleeve 66 with the contact head 53, said sleeve is provided with contact brushes or clips 71 which are mounted in the wall of the sleeve so as to extend inwardly into the bore thereof. Three of these brushes are provided each being at a different elevation within the bore, the vertical spacing being such that each brush 71 contacts one of the rings 57, 58 and 59 on the head 53, whereby electrical connection between the rings and brushes is had. Each brush or clip 71 has its inner end connected to a vertical bolt 72 which extends through the sleeve 66. The upper end terminates within a recess 73 provided in the upper end of the sleeve (Figure 21) and a terminal 74 is connected to this upper end. A suitable cover 73' covers the recess wherein the terminals 74 are located. From the above, it will be obvious that when the housing or post 13 is inserted into the pipe or extension 50 of the base, the sleeve 66 engages over the contact head 53 whereby the brushes 71 engage the rings 57, 58 and 59 to conduct the electrical current to the terminals 74. The terminal 74 which is connected to the uppermost contact ring 57 through its brush 71, has a wire A2 leading therefrom and this wire extends through the cover into and through a vertical passage 75 formed in one of the ribs 70 within the bore of the housing. The terminal 74 electrically connected to the second ring 58 has a wire B2 leading therefrom, while the terminal connected with the third ring 59 has a similar wire C2 extending therefrom, both of the wires B2 and C2 extending through the passage 75 with the wire A2, whereby the electrical current is conducted upwardly through the housing or post 13.

The interior of the housing or post has a transverse partition or web 76 therein which web is located nearer the lower end thereof, being spaced above the cylindrical portion 65 of the housing bore (Figures 9 and 21). An external, annular shoulder 77 is formed on the housing and when the lower end 77a of the housing is inserted within the pipe or extension 50 of the base this shoulder engages the upper edge of said pipe to limit the downward movement of the housing within the pipe.

The radial ribs 70 which are formed within the housing or post extend vertically between the web 76 and the cylindrical portion 65 of the bore, as is clearly shown in Figure 9. The provision of the ribs, four of which are shown, reduces the bore of the housing at this point, and radial slots or openings 78 are formed between the ribs. Vertical, frictional, clamping members 79 are located within the slots 78 and have their upper ends preferably made integral with the bottom of the web although they may be otherwise attached thereto. The inner surface of each member 79 is inclined and manifestly, the lower free end of said member may swing inwardly and outwardly of the housing. Normally, the members are within the slots 78 whereby insertion of the lower end of the housing 13 into the pipe 50 may be accomplished.

For expanding the members 79 into frictional engagement with the inner wall of the pipe or extension 50 to fasten these parts together, a bolt 80 extends through an axial opening 81 in the web 76 and has its lower screw-threaded end disposed between the members. An expanding wedge block or spider 82 has a central screw-threaded opening through which the bolt extends, and said block is formed with radial arms 83 adapted to engage the inner inclined surfaces of the members 79. The outer vertical surfaces of the arms 83 are inclined and when the bolt is rotated, the wedge block moves upwardly thereon, whereby it expands the members 79 into frictional engagement with the wall of the pipe 50. Such frictional engagement is sufficient to prevent removal of the housing or post from the base unit. A cotter key 84 passes through the lower end of the bolt to prevent the wedge block being displaced from the bolt 80.

The coin container chamber

Above the transverse partition or web 76, the bore of the housing or post assumes the cross-sectional shape shown in Figure 11 to form a chamber therein. An elongate vertical opening 85 which permits access to the interior of this chamber is provided at one side of said housing and this opening extends from the web 76 to an external shoulder 86. (Figures 9 and 21.) A vertical slot 87 is formed in the housing and is located diametrically opposite the opening 85. A sleeve 88 (Figure 21) is slidable vertically on the post or housing 13 and when the sleeve is in a raised position, its upper end abuts the shoulder 86 which may be grooved, as shown at 86' to receive this upper end. Manifestly, when the sleeve is in its raised position, it completely covers the opening 85 as well as the slot 87 diametrically opposite said opening. The slot 87 is provided for the purpose of accommodating the locking mechanism of a lock 89 (Figures 21 and 22) which is carried by the upper end of the sleeve 88 and which projects into the interior of the housing.

For holding and locking the sleeve 88 in its upper position whereby the opening 85 is closed, the lock 89 includes an inwardly projecting pin 90 which is arranged to be engaged by a spring pressed latch arm 91, as is clearly shown in Figure 21. The arm is pivoted within a recess 92 in the wall of the housing or post and engages beneath the pin to prevent downward movement of the pin and sleeve to which it is attached. The usual lock shaft 93 is journaled in the pin and has an angular lug 94 on its inner end. When the shaft 93 is rotated in a counter-clockwise rotation in Figure 21 by a key (not shown) inserted in the usual key slot of the lock, the lug engages the arm to depress the same and permit lowering of the sleeve 88. After the sleeve has been lowered and is again raised, the top of the pin will strike the latch to automatically depress the same to permit the sleeve to move to its raised position.

The lock 89 is utilized not only for the purpose of locking the sleeve 88 in its raised position, but also for permitting removal of the cap 14 which is threaded into the upper end of the housing or post 13. The underside or bottom of the cap is formed with a recess 95 (Figure 31) which recess is adapted to receive the upper end of a locking rod 96. The rod 96 extends vertically through the housing from the upper end thereof and has its lower end terminating within a recess 92', (Figures 23, 11 and 21). A block 97 is fastened on the rod 96 at the lower end thereof and a coiled spring 98 (Figure 23) engages the underside of the block to constantly urge the rod upwardly so that its upper end engages within the recess 95 in the cap 14. Manifestly, when so engaged rotation of the cap is prevented thereby preventing removal of the cap from the post 13.

For depressing the rod 96 to disengage it from the cap, the lock shaft 93 is provided with a second lug 99 which is adapted to engage the block when the lock shaft is rotated in a clockwise direction, as viewed in Figure 21. The locking mechanism is so constructed that one key is employed to rotate the shaft 93 in a clockwise direction to depress the rod 96, while another key is necessary to impart a counter-clockwise rotation to the shaft 93 to unlock the sleeve 88, both keys being insertable in the same key slot. Thus, the same key cannot be used for unlocking the sleeve to gain access to the interior of the housing above the web, as is employed for releasing the cap 14 at the top of the housing. This arrangement eliminates the necessity of providing two locks.

A coin container or receptacle 100 is adapted to be supported on the web 76 (Figure 26) and this container receives the coins which are deposited in the coin slot 17, as will be explained. The container is tubular and is formed with a depending flange 101 at its lower end, which flange is adapted to engage within a circular groove 102 formed in the top of the web 76 within the housing 13. As is clearly shown in Figures 11, 14 and 16, the groove is off center of the web, whereby the coin container is mounted nearer one side of the housing. The groove is located so as to place the container nearer the opening 85 which spaces the container from the diametrically opposite wall so as not to interfere with the vertical movement of the locking pin 90 which is mounted in the movable sleeve. The lower end of the container has an opening 103 at its lower end, whereby the coins may be removed therefrom. This opening is normally closed by a tape 104 which is initialed by the person placing the same thereon. A coin chute 105 has its lower end inserted within a longitudinal opening in the top of the coin container (Figure 26) and this chute leads upwardly in the housing as will be explained. From the foregoing, it will be seen that the coin container 100 may be readily removed from or inserted within the housing since access can be gained thereto by merely unlocking and lowering the sleeve 88.

The transformer unit

The coin chute 105 is supported on and is a part of a transformer unit 105', which unit is mounted within the housing or post 13 above the coin container. The transformer unit is clearly shown in Figures 6, 7 and 26 and includes a primary element 106 and a secondary element 107 which are confined between upper and lower members 109 and 108 respectively. The members are fastened together by straps 110 and it is pointed out that any suitable transformer such as may be purchased on the open market may be employed. The lower member 108 is shaped to conform to the shape of the bore of the housing or post 13 immediately above the coin container, and the cross-sectional shape of the housing at this point is clearly shown in Figure 16. The bottom member of the transformer is formed with end projections 111 (Figure 7) which are adapted to engage within vertical diametrically opposed grooves 112 in the housing. The grooves extend upwardly from the slot 87 and the access opening 85 and one of said grooves has a web 113 extending thereacross near its lower end. The transformer unit is insertable within the housing through the opening 85 which is exposed when the sleeve 88 is lowered, and said unit is moved upwardly into the housing until one of the projections 111 on its lower member 108 strikes the web 113. A set screw 114 extends through the projection 111 and engages in said web to fasten the transformer unit within the housing.

When so positioned within the housing, the lower member 108 of the transformer is adjacent the top of the coin container 100 (Figure 26). The lower end of the coin chute 105 depends from the transformer unit and said chute is curved to one side so as to extend contiguous to the elements of the transformer. The upper end of the coin chute extends inwardly of, and then upwardly through the central portion of a contact block 115 which is mounted on the upper end of the transformer unit 105' above the member 109. Manifestly, the transformer unit may be readily inserted within or removed from the housing or post, being held in place only by the screw 114. It is noted that when the transformer is in position within the housing, access to the electrical connections of the transformer through the opening 85 is prevented by the plate 108, thereby obviating any danger of electrical shock to a person removing or replacing the coin container 100.

The passage 75 within which the wires A2, B2 and C2 are confined extends from the cover 74 of the sleeve 66, which sleeve engages over the contact head 53 of the base unit, upwardly through the housing to an inwardly directed flange or shoulder 116 which is formed within the housing adjacent the upper end of the transformer unit 106. The three wires project from the upper end of the passage and are utilized to feed two separate electrical circuits, one of which is a constant circuit and the other is an impulsed circuit, as will be hereinafter explained. At this point, suffice it to say that the wire A2 is common to both circuits and its connection with either one or the other of the wires B2 and C2 will close an electrical circuit.

The upper end of the wire A2 which projects from the upper end of the passage 75 is connected to a contact terminal 117 which is located centrally of an insulating member 117a on the shelf 116, as is clearly shown in Figures 26 and 27. The wire B2 has its upper end connected to a terminal 118 which is located at one end of the insulating member, while the wire C2 has its end connected to a terminal 119 at the other end of said insulating member. A contact clip 120 is connected to the terminal 117 and similar clips 121 and 122 are secured to the terminals 118 and 119 respectively. As is clearly shown in Figures 26 and 29, the brushes or clips are in horizontal alinement with the contact block 115 which is carried by the upper end of the transformer unit 105'.

The block 151 is preferably constructed of porcelain and is secured to the upper member 109 of the transformer unit by screws 123. The side of the block which is adjacent the brushes 120, 121 and 122 is formed with a trio of recesses 124 which are alined with said brushes. A contact clip 125 is mounted in the central recess and has a projection 120' arranged to engage the clip 120 whereby the current from the wire A2 which is the wire common to both circuits, is conducted to the clip 125. A similar clip 126 having a projection 121' is mounted in one of the end recesses 124 for engagement with the brush 121, leading from the wire B2, and a clip 127 having a projection 122' is located in the third recess to contact the brush 122 which leads from the wire C2. When the transformer unit 105' is in position within the housing, the projections 120', 121' and 122' on the clips 125, 126 and 127 contact the brushes 120, 121 and 122 to electrically connect these parts. However, when the unit is removed, the electrical connection is broken since the clip projections move off the brushes.

For feeding the primary coil 106 of the transformer, lead wires 106a and 106b are connected to the clips 125 and 126 respectively, whereby the electrical circuit between the wires A2 and B2 which connect to these clips through the brushes 120 and 121, is complete. The output wires 107a and 107b which lead from the secondary coil of the transformer are connected to contact clips 128 and 129 which are mounted in recesses 130 in the block 115 on the side opposite the recesses 124. The clips 125, 126, 127, 128 and 129 are exactly alike in construction and each clip includes a U-shaped spring member or yoke 131 (Figure 26) which may either be made integral with the clip or may be separate therefrom and electrically connected therewith. The yoke is flexible to a degree, whereby a contact prong may be inserted therebetween to establish electrical connection therewith.

*The coin receiving and dial unit*

Above the transformer unit 106 and located within the upper portion of the tubular housing or post 13 is a coin receiving and dial unit 135. This unit is removable from the upper end of the housing and has means at its lower end for making electrical connection with the transformer unit, as will be explained. The unit includes a pair of side plates 136 and 137 (Figures 4, 5, 29, 33, 34; 36 and 37) between which the coin receiving mechanism is mounted. The neon tubes 16 and 22 together with the electrical apparatus for controlling the same, as well as the dials are mounted on the plates.

The plate 136 (Figures 33 and 34) has a spacer plate 138 secured to its inner surface by screws 139 and this spacer plate extends from the bottom or lower end of the plate 136 to a point near the upper end thereof. The upper end of the spacer is inclined as shown at 140. A circular opening 141 is formed in the spacer plate and an enlarged gear 142 is mounted to rotate therein. A concentric opening 143 is formed in the side plate 136 and is smaller in diameter than the opening 141, whereby the peripheral portion of the gear is hidden when observed from the outer side of the plate 136, the remainder of said gear being clearly visible through the opening 143. The central portion of the gear is cut out at 144 to form the aperture 21 and this opening is closed by a glass window 145. The portion of the gear surrounding the window is visible through the opening 143 in the side plate and this portion is provided with suitable indications or numerals, whereby the indicating dial 20 is displayed on the gear. The indications on the dial represent minutes or other durations of time. A stop lug 146 is integral with the plate 136 and extends inwardly into the opening 143 and is adapted to be engaged by a pin 146' which is secured on the gear to limit the movement of the gear when the mechanism is reset, as will be explained.

The dial 20 is indirectly lighted by one of the blue neon tubes 22 and for mounting said tube in position around the dial, a flanged collar 147 (Figures 4 and 32) is secured to the outer surface of the side plate 136 by screws 148. The collar has its outer edge turned inwardly to receive and conceal the tube 22 and the ends 22' of said tube extend outwardly and downwardly between the extremities of the collar. A ring 149 is inserted within the collar and has lugs 150 adapted to engage the tube 22 to hold the same within the inturned edge of the collar. The ring 149 is formed with a pointer or indicator 151 which is located at the bottom center of the dial when the collar is fastened on the plate 136 (Figure 5).

The gear 142 which has the dial thereon is rotated by means of a pawl 152 which pawl is adapted to engage the teeth of said gear. The pawl extends through an opening 153 in the side plate 136 and is preferably made integral with the lower end of an operating rod 155, which rod extends contiguous to the outer surface of the side plate and has its upper end pivotally secured to the outer end of a pivoted actuating arm 156 of a magnetic coil 157 which is suitably mounted on the outer face of the side plate above the dial. When the coil is energized, the arm is attracted to the coil and its swinging movement raises the rod 155. When the coil is de-energized, the rod is lowered and the pawl 152 on the lower end of the rod imparts a clockwise rotation to the gear 142 and dial 20 on said gear. The outer end of the arm 156 is guided in its movement by a bolt 158 which has its lower end extending through said arm. The upper end of the bolt is secured to a fixed bracket 159 and a coiled spring 160 surrounds the bolt, being confined between the bracket and arm, and constantly exerts its pressure to urge the arm to its lowered position. The spring also acts against the angular end 155' of the rod 155 and tends to move the pawl 152 inwardly of the gear teeth at all times. As will be explained, when the meter is operating, the coil 157 is energized by an electrical impulse at regular intervals, as for example each minute, whereby the gear and dial 20 are rotated to accurately register the time.

The large dial gear 142 is in constant engagement with a smaller gear 161 which is mounted above and at one side of the same. The small gear is disposed within a recess 162 provided therefor in the spacer plate. This small gear is, of course, rotated with the larger gear and is employed for resetting the dial, as will be hereinafter explained.

The other side plate 137 of the coin receiving and dial unit (Figures 36 and 37) is constructed in substantially the same manner as the plate 136, being provided with an inner plate 138', wherein a rotatable gear 142' exactly the same as the gear 142 is mounted. The gear 142' has a dial 20 surrounded by a collar 147' wherein the other blue neon tube 22 is mounted. The inner plate 138' has a recess 162' provided for a gear 161', similar to the gear 161, and when the plates are fastened together the gears 142 and 142', as well as the gears 161 and 161' are alined.

In assembling the plates 136 and 137, spacer members 163, 164 and 165 (Figure 37) are interposed therebetween, whereby the inner plates 138 and 138' of the side plates are spaced from each other the width of these spacer members. The spacer 163 extends throughout the length of the plates 136 and 138' at one side thereof and is provided with a recess 166 near its upper end. With the plates 136 and 137 assembled, the recesses 162, 162' and 166 form a pocket which accommodate the small gears 161 and 161'. The gears 161 and 161' are connected to each other in spaced relation by an integral hub 167 (Figure 8) and a headless bearing pin 167' extends through the hub, being fastened in the plate 137, whereby the gears are rotatable on said pin. A flat spring 168 is wound around the hub 167 and is disposed between the gears. One end of this spring is secured to the hub while its other end is fastened to a headless screw 169', which screw passes through the plate 136 and screws into the plate 137. This gear assembly may be removed when desired, by merely removing the pin 167' and screw 169', whereby it is not necessary to disassemble the coin receiving unit in the event that the spring 168 should break or if said assembly must be replaced or repaired for any other reason. The gears 161 and 161' are in constant mesh with the dial gears 142 and 142' which are rotated by the pawl 152 and the spring 168 is arranged to resist the rotation of the dial gears by said pawl. The rotation of the dial gears is, therefore, accomplished against the tension of the said flat spring.

For holding the dial gears 142 and 142' while the pawl moves upwardly to engage the next tooth of the gear 142 when the device is operating, a resilient ratchet bar 169 extends through an opening 170 in the side plate 137 (Figure 36) and has its lower end engaging the teeth of the gear 142'. This lower end operates in a recess 171 formed in the spacer member 163. The ratchet arm 169 extends upwardly on the outer side of the plate 137 and has its upper end secured to an ear 172 projecting outwardly from said plate. The flexibility of the ratchet arm holds said arm in engagement with the gear tooth at all times.

From the foregoing, it will be manifest that the dial gears 142 and 142' are rotatable by means of the pawl 152 which is operated by the energization of the coil 157 mounted on the plate 136. The coil is energized at regular intervals by a time impulse and thus the dials may be made so as to indicate the lapse of a predetermined parking time during one revolution or less of said dials. The step by step actuation of the gears is made possible by the flexible ratchet bar 169 which holds the gears against reverse rotation while the pawl is moving to the next gear tooth. Of course, as the dial gears are rotated the smaller gears 161 and 161' are rotated to wind the flat spring 168 tighter on the hub 167, whereby the tension is gradually increased as the dial gears rotate.

Interposed between the upper ends of the side plates 136 and 137 and resting on the upper edges of the inner plates 138 and 138', as well as on the spacers 163 and 164, is an inclined coin chute 175. The outer end of the chute is open and is inserted in an opening 17' in the housing, and when the unit 135 is within the housing 13, this open end forms the coin slot 17 whereby a coin inserted in said slot will fall or roll down the chute. The lower inner end of the chute is open at 176 and is disposed above the space between the spacer members 163 and 164 whereby the coin will fall downwardly between the inner plates 138 and 138'. The thickness of the spacer members is substantially equal to the width of the coin, being a few thousandths larger. The vertical inner edge of the spacer 164 is serrated or notched so as to prevent a wire, which may be inserted in the slot 17, from reaching the mechanism.

After the coin drops from the chute 175 it enters a vertical passage 177 which is formed between the spacer 164 and a vertically extending actuating bar 178. The bar 178 extends contiguous to the inner edge of the spacer 163 and has its upper end 179 bent outwardly to extend through a slot 180 in the wall of the plate 137. This upper end 179 is enlarged to bridge the frame of a magnetic coil 181 which is mounted on the outer side of the plate 137, whereby when the coil is energized the bar 178 is moved upwardly in the slot, such movement being limited by the height of the slot. The bar is normally held in its lower position by a laminated spring 182 (Figure 37) mounted within the spacer 163 and engaging a notch 183 in the upper portion of the bar.

When the coin drops through the chute and into the passage 177, said coin falls through the passage until it is trapped between an extended portion or point 183' on the bar and the edge of the spacer member 164. The point 183' is so spaced from the member that the coin cannot pass thereby and the coin is, therefore, trapped until the bar 178 is moved upwardly. The upward movement of the bar is, of course, controlled by the energization of the coil 181 and, therefore, a time switch 184 (Figure 4) is mounted on the outer side of the plate 137 below the coil 181. This switch controls the energization of the coil and is clearly shown in detail in Figures 42 to 44.

The time switch 184 is mounted within an insulating casing 185 and has a flexible arm 186 which is secured to a lug 187 within said casing. The outer end of the arm has an insulated projection 188 thereon and this projection extends through an opening 189 in the plates 137 and 138' and into the vertical coin passage 177, whereby when the coin falls through said passage it strikes the projection and swings the arm 186. It is noted that the projection is so positioned within the passage that the coin engages the same and remains in engagement therewith so long as it is retained between the point 183' on the bar and the spacer member 164.

When the flexible arm 186 is swung it engages a contact 190 carried thereby with a contact 191, which latter contact is carried by a contact arm 192. The engagement of these contacts closes an electrical circuit through the coil 181 and through a resistance 193' which is carried by a bar 193 constructed of thermostatic metal, whereby the bar is heated causing it to undergo movement. The resistance of 193' is sufficient to prevent coil 181 from acting to move the bar 178. As the bar 193 is heated and moves, this movement of the bar causes the engagement of electrical contacts 194 and 195 which cuts out the resistance in the coil circuit permitting the coil to act and impart movement to the bar 178. The employment of the switch 184 which incorporates the thermostatic bar 193, makes it necessary that the coin be momentarily stopped in the passage in order for the coil 181 to impart movement to the bar 178. Therefore, if an improper coin or slug were inserted in the coin chute, said coin would fall through the passage 177, but unless it is of a proper size it will not be stopped in said passage.

In such case, it would merely fall through the slot and would only depress the arm 186 momentarily which would not be sufficient to cause the coil 181 to move the bar 178, as the thermostatic bar would not be sufficiently heated to cut out the resistance in the circuit. Thus, it will be seen that the switch 184 eliminates any possibility of an improper coin operating the device. Also, the coin is not utilized to bridge and close an electrical circuit and, therefore, a metallic wire or other object cannot be inserted through the coin slot to engage and close a live circuit.

When the proper coin has been deposited, it will be trapped at the lower end of the passage 177 as has been explained, and the switch 184 will be operated to energize the coil 181. Energization of this coil will lift the bar 178 to move the point 183' and a recess 196 in said bar upwardly to permit the coin to drop against a second extended point 197 on said bar. The coin will again be stopped in its movement between this point and the extreme lower end 198 of the spacer member 164 and this position is shown by the coin, in the dotted lines 199. The coin has now moved away from the projection 188 of the switch 184 but is held in the position 199 until the bar again moves downwardly, which is upon de-energization of the coil 181. As soon as the coin disengages the projection 188 of the switch the circuit to the thermostatic bar 193' is broken, permitting said bar to cool and return to its normal position to disengage the contacts 194 and 195 which breaks the circuit to the coil 181. As soon as the coil is de-energized, the bar 178 is immediately lowered to its original position, whereby the coin is again permitted to fall.

As the coin moves downwardly it falls between the gears 142 and 142' onto the upper bevelled end of a retaining bar 200 which is secured to the inner plate 138' on the side plate 137. The upper end of this bar is located contiguous to the periphery of the window or opening 144 in the gears 142 and 142'. The coin engages the bar 200 and a third extended point 201 on the movable bar 178, whereby it is held in alinement with the openings and is clearly visible therethrough. The coin is maintained in this position until the next coin is inserted in the chute 175 and passage 177 to operate the switch and energize the coil 181 which raises the bar 178, permitting the coin held in alinement with the openings 144 to fall downwardly through a passage 202 formed between the spacer member 163 and the member 165. In this manner, one coin is always retained in alinement with the openings 144 in the dial gears until the next coin is inserted. If a slug or improper coin is inserted it will not operate the coil 181 as has been explained, but will fall downwardly into the outlet passage 202 through a by-pass 203 provided for the purpose. It is pointed out that when the coin is trapped within the passage 177 by the point 183 and between the gears by the point 201, said points are alined with or slightly above the center of said coin so as to prevent binding when the bar 178 is raised.

The spacer member 164 co-acts with the bar 178 to form the passage 177 and therefore, it is desirable to pivot the member on a screw 204 at its upper end whereby its lower end may be swung with relation to the bar so as to change the distance therebetween. By varying this distance the size of the passage may be varied so as to accommodate a coin of another size. The lower end of the member is slotted and a guide pin 205 engages therein to guide said lower end in its movement. A pin 206 engages within a slot in the lower end of the member and extends outwardly through the plates 138 and 136 (Figure 33) and is secured to one arm of a bell crank 207 mounted on the outer surface of the plate 136. By swinging the crank, the lower end of the member is adjusted with relation to the bar 178.

When the size of the passage 177 is varied to accommodate another size coin, the distance between the retaining bar 200 and the point 201 on the bar 178 must also be varied and therefore the lower end of said bar is pivoted on a screw 208. A pin 209 engages within a slot 210 in the bar and extends outwardly through the plates 137 and 138' being secured to a bell crank lever 211 (Figure 36), whereby swinging of said lever adjusts the bar 200. The elongate retaining bar 178 is formed with an elongate slot 212 in its lower end and a pin 213 engages said slot. The pin 213 extends through the plates 138' and 137 and is secured to one arm of a bell crank 214, whereby the lower end of the bar 178 may be swung to adjust the same with relation to the bar 200. The pin 213 and slot 212 also act to guide the bar 178 in its vertical movement.

The bar 178 is not only employed for releasing the coin which has been held in alinement with the openings 144 of the dial gears before the next coin drops between said gears, but is also utilized to reset the dials by returning the dial gears to a starting position which is indicated on the dial by the number of minutes in the parking period. Obviously upon the previous operation, the gears 142 and 142' have undergone rotation through the time impulse actuated coil 157 and pawl 152 to record the parking period. Therefore, when the next coin is inserted, it is necessary to return the dial gears to their original or starting position. As has been previously explained, the dial gears are in constant mesh with the smaller gears 161 and 161' which gears have the spring 168 acting thereon at all times. The only thing which prevents the gears 161 and 161' from rotating the dial gears is the engagement of the ratchet arm 169 with the teeth of the gear 142'.

When a coin is inserted in the chute 175 and falls downwardly through the passage 177, the bar 178 is raised. The lower end of the bar 178 has a notch 215 therein and this notch receives the ball member 216 (Figure 37) which is formed on the lower end of a release plunger 217. The plunger is movable vertically within a groove or channel 218 formed in the spacer member 163 and its upper end extends contiguous to the pawl 152 and the lower end of the ratchet bar 169. A projection or lug 219 having an upper inclined surface is made integral with the plunger and when said plunger is raised by the upward movement of the bar 178, the lug engages the pawl and ratchet bar, whereby said pawl and ratchet bar are moved outwardly and thus disengaged from the teeth of the gears 142 and 142'. Disengagement of the ratchet bar and pawl from said gear teeth permits the gears to be rotated in a reverse direction by means of the unwinding of the spring 168 acting on the small gears 161 and 161' to rotate the same. The spring has, of course, been wound and placed under sufficient tension during the step by step actuation of the gears 142 and 142' by the pawl during the previous operation. The return rotation of the gears is limited by the pin 146' (Figure 33) striking the lug 146 and by placing the pin in various locations about the periphery of the dial, different periods of setting may be had. As shown, the pin 146' is set so that the dial indicates the parking period as sixty minutes.

The resetting of the dials to their starting position with the allowed time on each dial opposite its indicator 151 is accomplished while the coin which has just been inserted is dropping from its initial position opposite the point 183 to the position 199. After the resetting, the time impulses are conducted to the magnetic coil 157 whereby the pawl 152 is actuated to impart the step by step rotation to the dials 20, whereby the time is registered by the dials.

In order to halt the movement or rotation of the dials after the parking period has expired, it is necessary that the circuit to the coil 157 which operates the pawl 152 be broken. To accomplish this purpose an outwardly extending arcuate lug 220 (Figures 8, 36, 40 and 41) is secured to the face of the gear 142' at the periphery thereof and extends through the opening 143' in the plate 137. The lug is so positioned on the gear and dial that when the parking time expires, and an additional period has lapsed, as will be explained, said lug moves beneath a pivoted shoe 221 to swing the shoe. As is shown in Figures 8 and 36, the shoe 221 has its upper end pivoted on a horizontal shaft 222, which shaft is mounted in ears 223 extending outwardly from a bracket 224. The bracket is secured to the outer face of the plate 137 by screws 225 and is located above the opening 143' in said plate. The lower end of the shoe is offset inwardly so that said lower end is in close proximity to the gear 142' and in the path of the lug 220. A spring 226 constantly urges the lower end of the shoe toward the gear and when the lug engages beneath the shoe, the latter is swung under tension of said spring.

The shoe 221 is provided with a horizontal extension 221a which is parallel to the shaft 222 and the outer end of the extension has an upwardly extending actuating bar 227 integral therewith. The bar 227 has its upper portion bent inwardly (Figures 4 and 5) and extends through an opening 228 in the plates 137 and 136. After passing through the plate 136, the bar is bent upwardly and extends into a switch housing 230 which is mounted at the upper end of the unit 135, as will be explained. The angular portion of the bar 227 (Figures 8 and 5) is arranged to engage the outer end 231' of a switch arm 231 of a control switch 232, which switch is connected in the time impulse circuit to the coil 157. So long as the lug 220 is disengaged from the shoe 221, the switch is closed whereby the circuit to the coil 157 is complete. However, when the lug rides under the shoe 221 to swing the same, the bar 227 is also swung which causes the switch arm 231 to be swung, breaking the circuit to the coil 157 and halting rotation of the gears 142 and 142' and dials thereon. As long as the lug remains beneath the shoe, the circuit to the coil 157 is broken and the dials cannot register any more time until another coin is inserted to energize the resetting coil 181, which coil as has been explained, will cause a return of the dials to their starting position.

The cut-off switch 232 is mounted on the outer surface of the plate 136 above the coil 157 and, as clearly shown in Figures 46 and 47, the switch includes an insulating housing, preferably porcelain, with the flexible switch arm 231 fastened therein. The arm has its tip 231' insulated and also has a contact 233 which is, normally in engagement with a contact 234 to close the circuit to the coil 157. When said arm is swung by the swinging of the bar 227 the circuit is broken and remains so until said bar 227 is permitted to return to its normal position.

The extreme upper end of the arm 227 extends into the switch housing 230 and is utilized to control the electrical switches which control the lighting of the tubes 16. When the bar 227 is in a normal position with the lug 220 disengaging the shoe, the blue tubes 22 are lighted, but as soon as the lug engages the shoe and the bar is swung, said blue tubes are extinguished. Therefore, so long as the parking period is continuing and is being registered by the dials, the blue tubes 22 are illuminated. The details of the control switches within the switch housing 230 will be hereinafter described.

For controlling the illumination of the red tube 16 within the cap 14, a second shoe 235 is mounted on the horizontal shaft 222 and is also adapted to be engaged by the lug 220. This shoe is of a greater length than the shoe 221 whereby the lug remains beneath said shoe a predetermined length of time, and said shoe is located so as to be engaged by said lug before the lug rides beneath the shoe 221. An actuating bar 236 extends upwardly from the extension 235' of the shoe 235 and has its upper end projecting into the switch housing 230 to co-act with the bar 227 to control the electrical switches for the tubes.

When the lug 220 passes beneath the shoe 235, the bar 236 is swung to light the red tube 16 within the cap. At this time, the lug has not engaged the shoe 221 so that the dials are still rotating and the blue tubes 22 are lighted. The red tube remains lighted so long as the lug 220 is beneath the shoe 235 and the spacing between the shoes is such that the lug passes beneath the shoe 221 before it disengages the shoe 235. Therefore, when the lug actuates the shoe 221, the actuating arm 227 is swung to extinguish the blue tubes and stop rotation of the dials. The halting of the movement of the dials is thus accomplished before the lug 220 passes from beneath the elongate shoe 235 and therefore, the red tube 16 remains illuminated until the next coin is inserted to reset the dials. Resetting of the dials moves the lug from beneath both shoes 220 and 235, whereby the red light is extinguished and the blue light is lighted and the switch 232 closed to set up the time impulse to the coil 157.

In order to mount the switch housing 230 at the upper end of the unit 135, a supporting yoke 237 is inserted between the upper ends of the plates 136 and 137. The lower end of the yoke is immediately above the coin chute 175 (Figure 37) and suitable screws pass through both plates and yoke. The switch housing 230 is circular in cross-section and is formed with diametrically opposed grooves 238 which are adapted to receive the yoke arms. The switch housing is thus supported within the yoke with the grooves preventing rotation thereof. The red neon tube 16 is mounted in the upper end of the housing 230 (Figures 4 and 5) and a suitable bail 239 is secured to the upper end of the yoke arms to facilitate insertion and removal of the unit 135 through the upper end of the tubular housing or post 13. It is pointed out that the diameter of the switch housing is sufficient to completely close the upper end of the housing 13 when the cap 14 is removed, thereby preventing access to the mechanism within the housing 13.

The entire coin receiving and dial unit is, therefore, insertable through the open upper end of the tubular post and when in position therein has its dials 20 visible through the lens 19 which are disposed within the sight openings 18 in the post with the open end of the coin chute in alinement with the opening 17' in the housing. The vertical edges of the unit 135 engage within vertical grooves 240 formed in the inner wall of the bore of the post at the upper end thereof, whereby rotation of the unit 135 within the bore is prevented (Figures 9, 10, and 12).

For establishing electrical connection between the lead wires A2, B2 and C2, the lower end of the unit 135 has an insulating block 241 attached to the plate 137. This block is formed with a trio of depending prongs 125', 126' and 127' which are spaced so as to engage in the spring members or yokes 125, 126 and 127 respectively in the insulating block 115 at the upper end of the transformer unit. The prongs have terminals at their upper ends and wires A3, B3 and C3, lead from the prongs 125', 126' and 127' respectively. When the unit 135 is lowered into the post 13, the prongs engage the spring yokes or members to establish electrical connection therebetween.

The upper end of the block 241 has a pair of recesses 242 therein and terminals 243 are mounted within said recesses. The blue neon tube 22 which surrounds one of the dials 20 visible through the plate 137 has its extremities connected to the terminals 243.

An insulating block 244 is mounted opposite the block 241, being secured to the lower end of the plate 136. This block has a pair of depending prongs 128' and 129' which are insertable within the spring yokes of the clips 128 and 129 in the transformer block 115 to establish electrical connection with the wires 107a and 107b of the secondary coil 107 of said transformer. The upper end of the block 244 is formed with a pair of recesses 245, wherein terminals 246 are mounted and the extremities of the second blue neon tube which surrounds the other dial 20 in the plate 136. The tubes 22, as well as the red tube 16 at the top of the post are electrically connected to the prongs 128' and 129' by suitable lead wires as will be described in the wiring diagram. The lead wires A3, B3 and C3 which have one end connected to the prongs 125', 126' and 127' are connected to the various switches and coils which operate the device.

From the foregoing, it will be obvious that the coin receiving and dial unit is insertable within the upper end of the post 13 and is electrically connected with the transformer unit through the depending prongs. As clearly shown in Figure 29 the upper end of the unit projects slightly above the top of the post whereby the red neon tube 16 is above the upper end thereof. The upper end of the unit is enclosed by the cap 14 which is threaded into the post and said cap has its top spaced from the lower portion of the cap by the vertical pins or posts 15. A suitable annular glass or other transparent panel 15' is mounted within the cap behind the pins to prevent water or other extraneous matter entering the cap. The underside of the top of the cap is provided with vents or openings 14' which are disposed between the pins 15 for ventilating the interior of the housing 13 (Figure 30). The cap is, of course, locked in place on the post 13 by the vertical locking rod 96 which enters the recess 95 in the bottom of said cap.

*The electrical apparatus and wiring diagram*

The dials 20 are rotated to indicate the time or parking period by the energization of the magnetic coil 157 and the circuit to this coil is controlled by the switch 232. This coil is energized by an electrical impulse. The switch 232 is located adjacent the actuating arm 227 which is operated by the engagement of the lug 220 with the shoe 221. The resetting coil 181 is energized when the switch 184 is closed and the latter switch is controlled by the coin within the passage 177. Therefore, when a coin is inserted, the switch 184 is actuated to reset the dials and cause the lug 220 to disengage both shoes 221 and 235. The switch 184 is closed only for a short period for as soon as the coin passes the projection 188 of the switch, the same is again opened. As the lug moves from beneath the shoe 221, the arm 227 attached to the shoe permits the switch 232 to close the circuit, whereby the circuit to the coil 157 is complete and said coil is energized periodically by an electrical time impulse originating at some remote point, to impart a step by step action to the gears 142 and 142' and dials. This rotation continues until the lug 220 again rides beneath the shoe 221, at which time the switch 232 is again opened to halt the rotation of the dials. The parts remain in this inactive position until the next coin is inserted, which again operates the switch 184 to repeat the cycle.

As before stated, the actuating bars 227 and 236 which are a part of the shoes 221 and 235 extend upwardly into the switch housing 230 to control the actuation of the switches within this housing. The housing 230 is constructed of a plurality of disks 250, 250', 250b and a cover 250A which are mounted one above the other and suitably fastened together, as is shown in Figures 4, 5, 29 and 48 to 50, by bolts 251. The disk or partition 250b which is interposed between the disk 250' and the cover 250A, has an axial, upstanding, tubular shank 250c and the tube 16 surrounds said shank, whereby said tube is alined within the cap 14 of the housing 13. The lowermost disk 250 is formed with a pair of elongate recesses 252 and 253 in its upper surface. A slot 254 is formed at one end of the recess and the upper end of the actuating bar 236 which is operated by the shoe 235 extends through this slot and is movable within the recess. A metallic switch arm 255 is disposed within the recess 252 and has one end fastened to a lug 256 which depends from a metallic angular contact 257. The member 257 is mounted within a recess 258 in the second disk 250'. The arm 255 has its other end overlying the slot 254 in the path of the actuating bar 236. A second switch arm 259 is located within the recess 252 and has one end located in the path of the actuating bar while its other end is attached to a lug 260 which depends from a bridging member 261 which is mounted in a recess 262 in the second disk 250', the latter recess being disposed adjacent one end of the recess 258.

The switch arm 255 has a contact which is adapted to engage a lug 264 which depends from a contact terminal 265 mounted in a recess 266 within the disk 250'. A wire 129a has one end connected to the terminal 265 while its other end is connected to the prong 129' at the lower end of the coin receiving and dial unit 135. When the switch arm 255 is engaging the lug 264, the current will flow from the transformer secondary coil 107 to the terminal 265, then through the arm 255 and to the angular contact member 257 in the disk 250'. This member has an upwardly extending lug 267 which projects through the uppermost disk 250b into the space under the cover 250a of the switch housing (Figure 51).

The extremities of the red neon tube 16 are located within the disk 250a, and one of the extremities of said tube is electrically connected to the lug 267 whereby current flows to the tube. The other end of the tube 16 is electrically connected to a lug 268 which projects upwardly from the bridging member 261. An extension 269 on the bridging member is formed with a depending lug 270 which projects into the recess 253 in the lowermost disk 250. A switch arm 271 is fastened to the lug 270 and is adapted to engage a lug 272 which depends into the recess from a terminal 273 mounted in a recess 274 in the middle disk 250'. The terminal 273 is connected to the prong 128' of the unit 135 by a wire 128a, whereby said terminal is electrically connected to the other side of the secondary coil of the transformer unit. When the switch arms 255 and 271 are in the position shown in Figure 48, the circuit from the transformer to the red tube 16 is complete, whereby said tube is illuminated.

Within the recess 253 and adjacent the switch arm 271, a second switch arm 275 which is also adapted to engage the lug 272, has one end attached to a lug 276 which depends from a terminal 276'. The outer ends of the switch arms 271 and 275 overlie a vertical slot 277 which extends through the disk 250 at one end of the recess. The upper insulated end of the actuating bar 227 which is operated by the shoe 221 extends into the slot between the ends of the switch arms 271 and 275 and obviously, the position of the bar causes one or the other of said arms to engage the lug 272. Similarly, the position of the bar 236 causes one or the other of the switch arms 255 and 259 to engage the lug 264.

Assuming that the meter is inactive, that is, the dials 20 are not operating which means that the arcuate lug 220 on the gear 142' is beneath both of the shoes 221 and 235, whereby the actuating bars 227 and 236 are in the position shown in Figure 48. At this time the red neon tube 16 is lighted with the blue tubes 22 extinguished to indicate that a coin must be inserted, the switch arms 255 and 271 engaging the lugs 264 and 272 respectively. The current flows from the wire 129a, through the lug 264, arm 255, lug 256, angular contact 257, lug 267, to the tube 16, then through the lug 268, bridging member 261, lug 270, switch arm 271, lug 272 and finally to the terminal 273 and wire 128a which completes the circuit, whereby the red tube is illuminated. The blue tubes 22 are fed through wires 22A and 22B which are fastened to the bridging member 261 and terminal 276' and obviously, when the switch arms are in the position shown in Figure 48, the circuit between these wires is not complete and the blue tubes are extinguished with only the red tube 16 lighted.

When a coin is inserted in the chute 175 and falls into the passage 177, the switch 184 is actuated and the resetting coil 181 operated to return the dials to starting position, which causes the lug 220 to ride from beneath the shoes 221 and 235. When this occurs, the actuating bars 227 and 236 are swung to the position shown in dotted lines in Figure 48, which disengages the switch arms 255 and 271 from the lugs 264 and 272, breaking the circuit to the red tube 16 and extinguishing the same. At the same time that the arms 255 and 271 are disengaged from the lugs 264 and 272, the arms 259 and 275 are permitted to engage said lugs, whereby the circuit to the blue tubes 22, as will be explained, is closed to illuminate said tubes. It is noted that the diameter of the insulated bars 227 and 236 are such that the arms 259 and 275 engage the lugs 264 and 272, before the arms 255 and 271 are disengaged therefrom, thereby preventing arcing.

In closing the circuit to the blue tubes, the current flows through the wire 129a, lug 264, arm 259, lug 260 and to the bridging member 261 from which it flows to one end of one of the tubes 22 through the wire 22A. The current passes through one tube 22, then through a wire 22c to one end of the other tube 22. This second tube has its other end connected to the wire 22b which leads to the terminal 276'. From the terminal 276', the current flows through the lug 276, switch arm 275 and lug 272 to the terminal 273 and wire 128a to complete the circuit. Thus it will be seen that this position of the switches (Figure 52) illuminates the blue tubes 22 while the red tube 16 is extinguished. This condition remains during the parking period to illuminate the dials, making the same clearly visible throughout the period.

When the parking time expires, the lug 220 on the gear 142' moves beneath the shoe 235 to swing the shoe and the actuating bar 236 back to the position shown in full lines in Figure 48; however, the lug has not yet engaged the shoe 221 controlling the bar 227 and this latter bar remains in the position indicated in dotted lines in Figure 48. As the bar 236 is moved the switch arm 259 is disengaged from the lug 264 and the arm 255 re-engaged therewith. This causes an illumination of both the red tube 16 and the blue tubes 22 during the duration of time that the lug 220 is travelling beneath the shoe 235 and before said lug engages the shoe 221.

At this time, the current flows from the wire 129a, through lug 264, switch arm 255, lug 256, contact 257, through the upwardly extending lug 267, tube 16, lug 268, bridging member 261, wire 22A, then through the blue tubes 22, wire 22B and then to the terminal 276'; from the terminal, the current flows through lug 276, switch arm 275, lug 272, and finally to the terminal 273 and wire 128a to complete the circuit. With such arrangement, both the red tube 16 and blue tubes 22 are illuminated at the same time.

The illumination of both red and blue tubes at the same time indicates to the observer that the parking time has expired. This condition remains until the lug 220 engages the shoe 221 to swing the actuating arm 227 to the position shown in full lines in Figure 48. This movement of the arm 227 disengages the arm 275 from the contact lug 272 which permits the arm 271 to engage said contact 272 which closes the circuit to the red tube 16 alone, thereby extinguishing the blue tubes 22. The length of time which both the red and blue lights are illuminated depends entirely upon the length of the shoe 235 for this determines the length of time that the lug 220 engages therebeneath.

Summary of operation

Assuming the meter to be inactive, the dials 20 are not rotating and the arcuate lug 220 on the gear 142' is beneath both shoes 221 and 235, whereby the actuating bars 227 and 236 are in the position shown in Figures 8 and 48. As has been explained, with the bars in this position, the red neon tube 16 is lighted, with the blue tubes 22 extinguished, thereby indicating that the meter is inactive and that a coin must be inserted.

When a coin is inserted into the coin chute 175, it falls into the passage 177 and actuates the switch 184 which energizes the resetting coil 181, whereby the dials 20 are returned to a starting position by the spring 168, gears 161, 161', 142 and 142'. As the dials rotate to their starting or original position, the lug 220 on the gear 142' moves from beneath the shoes 221 and 235, whereby the actuating bars 227 and 236 are moved to the position shown in dotted lines in Figure 48. Such movement, as has been explained, breaks the circuit to the red neon tube 16 and extinguishes the same.

When the bar 227 is swung to extinguish the red tube 16, said bar closes the switch 231 so as to complete a circuit to the operating relay or coil 157, which relay serves to impart a step-by-step rotation to the gears 142 and 142' and indicating dials thereon. The coil 157 is energized by a synchronous electric motor 300 which sets up time impulses at regular intervals. The time impulse mechanism forms no part of the present invention and, as shown in Figure 8, is of the usual construction. This mechanism includes a cam 300A having a pivoted arm 300B riding on its periphery. The arm 300B is pivoted on a second arm 300c and a spring 300d is secured to the arm 300B holding it in engagement with the cam 300A. The outer end of the arm 300B is adjacent a switch blade 301 which is arranged to engage a blade 302 to close a circuit to a relay 303 to energize the latter. The relay 303 controls a switch arm 304 which closes the circuit to the operating coil 157 of the meter.

The cam is carried by the constantly rotating shaft and as the arm 300B drops off the offset in the cam 300A, the switch blades 301 and 302 are engaged to close a circuit to the relay 303 and thereby energize the operating coil 157. When the second arm 300c drops off the offset in the cam, the end of the arm 300B is disengaged from the blade 301 to break the circuit. As the cam rotates, the making and breaking of the circuit to the coil 157 of the meter is continued resulting in a step-by-step actuation of the dials.

When the bars 227 and 236 were swung to begin operation of the dials and to extinguish the red tube 16, the blue tubes 22 were illuminated, as has been explained, to indicate that the parking time has been paid for and also to make the dials and coin more visible.

Upon expiration of the parking time, the gear 142' has rotated so that the lug 220 again moves beneath the shoe 235 to swing the actuating bar 236 back to its original position (full lines, Figure 48), whereby a circuit is set up which illuminates both the red tube 16 and the blue tubes simultaneously. This indicates that the parking time has just expired. This condition remains until the lug 220 moves beneath the actuating arm 227 to swing said arm back to its original position (Figures 8 and 48), whereby the blue tubes 22 are extinguished and the circuit to the operating coil 157 broken. Thus, the dials are halted and the red light alone remains illuminated. Insertion of another coin will repeat the operation.

The device is entirely automatic in its operation and obviously, any number of meters may be operated from a synchronous electric motor 300 (Figure 8) which sets up the time impulses for energizing the coils 157 of said meters. The wiring being a parallel circuit permits any one unit to be readily removed from the tubular housing or post without disturbing the other parts. This facilitates servicing of the device for obviously any unit may be removed when worn and in need of repair and replaced with a new unit. The arrangement of the electrical connections between the units is such that as soon as any one unit is moved a slight distance the circuit thereto is broken which prevents injury to the workmen by electrical shock. The electrical clips, prongs and other points of connection are so located that they cannot be easily reached from any of the access openings in the post. The housing is substantially cylindrical throughout its length whereby sharp objectionable projections are eliminated. The use of the neon tubing is advantageous because of its visibility during the daytime, but bulbs or other means of lighting may, if desired, be used.

What I claim and desire to secure by Letters Patent is:

1. A coin operated parking meter including, a tubular housing having an opening therein, a rotatable dial within the housing and visible through the opening and having time indicating graduations thereon, means adjacent the dial for illuminating said dial to make the same clearly visible, means actuated by the insertion of a coin in the meter for operating the illuminating means, means also actuated by the insertion of the coin for placing the dial in operation, and a luminous signal mounted in the housing and visible to an observer, said signal being controlled in its actuation by the dial and being arranged to be lighted when the parking period has expired.

2. A coin operated parking meter including, a tubular housing having an opening therein, a rotatable dial within the housing and visible through the opening and having time indicating graduations thereon, means for illuminating said dial to make the same clearly visible, means actuated by the insertion of a coin in the meter for operating the illuminating means, means also actuated by the insertion of the coin for placing the dial in operation, a luminous signal mounted in the housing and visible to an observer, said signal being controlled in its actuation by the dial and being arranged to be lighted when the parking period has expired, the control means for the signal also being actuated by the insertion of a coin for extinguishing said signal.

3. A coin operated parking meter including, a tubular housing having an opening therein, a time indicating mechanism within the housing and visible through the opening, means for illuminating the opening, a signal carried by the housing and arranged to be illuminated for indicating the expiration of a parking period and being normally lighted when the time indicating mechanism is inactive, a coin passage within the housing, means operated by the insertion of a coin into the passage for actuating the time indicating means, means also actuated by the insertion of the coin for operating the illuminating means for the opening and for extinguishing the signal, and means associated with the time indicating means for extinguishing the illumination means for the opening and for relighting the signal when the parking period as indicated by the time indicating means has expired.

4. A coin operated parking meter including, a tubular housing having an opening therein, a time indicating mechanism within the housing and visible through the opening, means for illuminating the opening, a signal carried by the housing and arranged to be illuminated for indicating the expiration of a parking period and being normally lighted when the time indicating mechanism is inactive, a coin passage within the housing, means operated by the insertion of a coin into the passage for actuating the time indicating means, means also actuated by the insertion of the coin for operating the illuminating means for the opening and for extinguishing the signal, and means actuated by the time indicating means for relighting the signal while the illuminating means is illuminated to indicate "overtime" when the parking period has expired.

5. A coin operated parking meter including, a tubular housing having alined openings in opposite sides thereof, a rotatable dial within the housing and visible through the openings and having time indicating graduations thereon, means actuated by the insertion of a coin into the parking meter for operating the dial, means for indirectly illuminating said openings and dial to make the same clearly visible, means also actuated by the insertion of the coin for lighting the indirect illuminating means for the openings, and an overtime signal mounted in the housing and visible to an observer when illuminated, and means associated with the dial and actuated thereby for lighting said signal when the parking period has expired.

6. A coin operated parking meter including, a tubular housing having alined openings in opposite sides thereof, a rotatable dial within the housing and visible through the openings and having time indicating graduations thereon, means actuated by the insertion of a coin in the meter for operating the dial, means for indirectly illuminating said openings and dial to make the same clearly visible, means also actuated by the insertion of the coin for lighting the indirect illuminating means, an overtime signal mounted in the housing and visible to an observer when illuminated, means associated with the dial and actuated thereby for lighting said signal when the parking period has expired, and means actuated by the insertion of a coin for extinguishing the illuminated overtime signal.

7. A coin operated parking meter including, a tubular housing having alined openings in opposite sides thereof, time indicating rotatable dials within the housing and visible through the alined openings whereby they may be readily observed from either side of the housing, means for operating the time indicating dials, means operated by the insertion of a coin into the meter for actuating the operating means, means for indirectly illuminating the openings to increase the visibility of the dials when the same are operated, an overtime signal mounted in the housing and normally illuminated when the time indicating dials are inactive prior to the insertion of a coin, control means for controlling the lighting and extinguishing of the illuminating means for the openings and of the overtime signal, means actuated when a coin is inserted for operating the control means to illuminate the opening and to extinguish the signal, and means actuated by the dials for again operating the control means to again light the overtime signal when the parking period as indicated by the time indicating dials has expired.

8. A coin operated parking meter including, a tubular housing having alined openings in opposite sides thereof, time indicating rotatable dials within the housing and visible through the alined openings whereby they may be readily observed from either side of the housing, means for operating the time indicating dials, means operated by the insertion of a coin into the meter for actuating the operating means, means for indirectly illuminating the openings to increase the visibility of the dials when the same are operated, an overtime signal mounted in the housing and normally illuminated when the time indicating dials are inactive prior to the insertion of a coin, control means for controlling the lighting and extinguishing of the illuminating means for the openings and of the overtime signal, means actuated when a coin is inserted for operating the control means to illuminate the opening and to extinguish the signal, means actuated by the dials for again operating the control means to again light the overtime signal when the parking period as indicated by the time indicating dials has expired, and means for maintaining the opening illuminating means lighted for a predetermined length of time after the overtime signal has been illuminated after which said means is extinguished, whereby the overtime signal and the opening illuminating means are both lighted during such predetermined length of time immediately following the expiration of the parking period.

9. A coin operated parking meter including, a housing having alined openings in opposite sides thereof, a time indicating mechanism within the housing and visible through the openings, means for operating the mechanism means for setting said operating means into operation by the insertion of a coin into the meter, means for retaining the coin within the housing opposite the alined openings whereby said coin is clearly visible through said openings, means for indirectly illuminating said openings to make the time indicating mechanism and coin clearly visible after said coin has been deposited to actuate said mechanism, an illuminated overtime signal mounted in the housing and visible to an observer, and means for lighting the overtime signal when the time indicating mechanism is not operating.

10. A coin operated parking meter including, a housing having alined openings in opposite sides thereof, a time indicating mechanism within the housing and visible through the openings, means for operating the mechanism means for setting said operating means into operation by the insertion of a coin into the meter, means for retaining the coin within the housing opposite the alined openings whereby said coin is clearly visible through said openings, means for indirectly illuminating said openings to make the time indicating mechanism and coin clearly visible after said coin has been deposited to actuate said mechanism, an illuminated overtime signal mounted in the housing and visible to an observer, means for lighting the overtime signal when the time indicating mechanism is not operating, and means actuated by the insertion of the coin for extinguishing the overtime signal at the same time that the time indicating mechanism is actuated.

11. A coin operated parking meter including, a housing having alined openings in opposite sides thereof, time indicating rotatable dials within the housing and visible through the alined openings whereby they may be readily observed from either side of the housing, means controlled in its actuation by the insertion of a coin into the meter for operating the time indicating dials, said dials having apertures therein, means for retaining the coin which is inserted into the meter within the housing opposite said apertures whereby the coin is visible therethrough, means for indirectly illuminating the openings to increase the visibility of the dials and coin when the dials are operated, an overtime signal mounted in the housing and normally illuminated when the dials are inactive prior to the insertion of the coin, control means for controlling the lighting and extinguishing of the illuminating means for the openings and of the overtime signal, means controlled in its actuation by the insertion of a coin for operating the control means to extinguish the overtime signal and light the illuminating means to illuminate the openings, and means actuated by the dials for again lighting said signal when the parking period as indicated by the dials has expired.

12. A coin operated parking meter including, a housing having alined openings in opposite sides thereof, time indicating rotatable dials within the housing and visible through the alined openings whereby they may be readily observed from either side of the housing, means controlled in its actuation by the insertion of a coin into the meter for operating the time indicating dials, said dials having apertures therein, means for retaining the coin which is inserted into the meter within the housing opposite said apertures whereby the coin is visible therethrough, means for indirectly illuminating the openings to increase the visibility of the dials and coin when the dials are operated, an overtime signal mounted in the housing and normally illuminated when the dials are inactive prior to the insertion of the coin, control means for controlling the lighting and extinguishing of the illuminating means for the openings and of the overtime signal, means controlled in its actuation by the insertion of a coin for operating the control means to extinguish the overtime signal and light the illuminating means to illuminate the openings, means actuated by the dials for again lighting said signal when the parking period as indicated by the dials has expired, means for maintaining the opening illuminating means lighted for a predetermined length of time after the overtime signal has been illuminated whereby the overtime signal and opening illuminating means are lighted during such predetermined length of time immediately after the parking period has expired, and means for extinguishing said illuminating means for the openings after the lapse of said predetermined length of time whereby the overtime signal alone remains illuminated until the insertion of the next coin.

13. A coin operated parking meter including, a housing having an opening therein, a rotatable time indicating dial within the housing and visible through said openings, means controlled in its actuation by the insertion of a coin to reset the indicating dial to return it to a starting position from which it has moved upon the previous operation, means also controlled in its actuation by the insertion of the coin for operating said dial to indicate time, control means operated by the resetting of said dial to illuminate the opening to increase the visibility of the dial while the same is operating, said control means again being actuated by said dial for extinguishing said illumination after the parking period as indicated by said dial has expired, and means for stopping the operation of the dial.

14. A coin operated parking meter including, a housing having an opening therein, a rotatable time indicating dial within the housing and visible through said openings, means controlled in its actuation by the insertion of a coin to reset the indicating dial to return it to a starting position from which it has moved upon the previous operation, means also controlled in its actuation by the insertion of the coin for operating said dial to indicate time, control means operated by the resetting of said dial to illuminate the opening to increase the visibility of the dial while the same is operating, said control means being again actuated by said dial for extinguishing said illumination after the parking period as indicated by said dial has expired, means for stopping the operation of the dial, an overtime signal within the housing and visible to an observer and normally illuminated when the dial is inactive prior to the insertion of a coin, said overtime signal being controlled by the control means so as to be extinguished by the resetting of the dial and relighted when the parking period has expired.

15. A coin operated parking meter including, a housing having an opening therein, a rotatable time indicating dial within the housing and visible through said openings, means controlled in its actuation by the insertion of a coin to reset the indicating dial to return it to a starting position from which it has moved upon the previous operation, means also controlled in its actuation by the insertion of the coin for operating said dial to indicate time, control means operated by the resetting of said dial to illuminate the opening to increase the visibility of the dial while the same is operating, said control means being again actuated by said dial for extinguishing said illumination after the parking period as indicated by said dial has expired, means for stopping the operation of the dial, an overtime signal within the housing and visible to an observer and normally illuminated when the dial is inactive prior to the insertion of a coin, said overtime signal being controlled by the control means so as to be extinguished by the resetting of the dial when the parking period has expired, and means controlled by the dial for maintaining the opening illuminated for a predetermined length of time after the overtime signal has been relighted at the expiration of the parking period, whereby the opening is illuminated and said signal is lighted for a predetermined length of time.

16. A coin operated parking meter including, a base member adapted to be anchored to a support and having electrical lead wires extending thereinto, a contact head within the base and having said wires connected thereto whereby the electrical current is conducted thereto, an elongate upper housing adapted to be mounted on said base member and secured thereto, a contact sleeve arranged to fit over said head to make electrical connection therewith when the housing is attached to the base, said housing having a coin chamber within its lower portion above the contact sleeve, contact terminals at one side of the housing within the same and spaced above the coin chamber, lead wires connecting said terminals with the sleeve, a transformer removably mounted within the housing above the coin chamber and having electrical terminal clips for engaging the terminals to establish electrical connection therebetween when the transformer is within the housing, a coin receiving and dial unit removably mounted in the housing above the transformer and having contact terminals at its base for making electrical connection with the transformer and terminals, and electrically operated controls carried by the unit and electrically connected by lead wires to the unit terminals whereby electrical current for operating said controls is conducted thereto.

17. A coin operated parking meter including, a base member adapted to be anchored to a support and having electrical lead wires extending thereinto, a contact head within the base and having said wires connected thereto whereby the electrical current is conducted thereto, an elongate upper housing adapted to be mounted on said base member and secured thereto, a contact sleeve arranged to fit over said head to make electrical connection therewith when the housing is attached to the base, said housing having a coin chamber within its lower portion above the contact sleeve, contact terminals at one side of the housing within the same and spaced above the coin chamber, lead wires connecting said terminals with the sleeve, a transformer removably mounted within the housing above the coin chamber and having electrical terminal clips for engaging the terminals to establish electrical connection therebetween when the transformer is within the housing, a coin receiving and dial unit removably mounted in the housing above the transformer and having contact terminals at its base for making electrical connection with the transformer and terminals, electrically operated controls carried by the unit and electrically connected by lead wires to the unit terminals whereby electrical current for operating said controls is conducted thereto, visible dials carried by the unit, a removable cap closing the upper end of the housing, and a luminous tube disposed within the cap and electrically connected to the transformer through the contact terminals at the base of the unit.

18. A coin operated parking meter including, a base member adapted to be anchored to a support and having electrical lead wires extending thereinto, an upper housing mounted on the base and having means for making electrical connection with the wires when mounted on said base, said connection being broken when the housing is removed, a transformer removably mounted within the housing and electrically connected to said lead wires when mounted therein, a coin receiving and dial unit removably mounted within the housing above the transformer and adapted to be electrically connected with said transformer and lead wires when inserted within the housing, and electrical illuminating elements carried by the unit and supplied with electrical current by said transformer and said wires.

19. A coin operated parking meter including, a base member adapted to be anchored to a support and having electrical lead wires extending thereinto, an upper housing mounted on the base and having means for making electrical connection with the wires when mounted on said base, said connection being broken when the housing is removed, said housing having a coin chamber therein and having an opening in its wall for permitting access to said chamber, a coin container within the chamber, a sleeve slidable on the exterior of the housing for closing said opening, means for locking said sleeve in position over the opening, a transformer removably mounted above the coin chamber within the housing and insertable through the access opening and coin chamber, said transformer being electrically connected to the lead wires when mounted within the housing, a coin receiving and dial unit removably mounted within the housing above the transformer and adapted to be electrically connected with said transformer and lead wires when inserted within the housing, electrical illuminating elements carried by the unit and supplied with electrical current by said transformer and said wires, and means for conducting coins from said unit to the container within the coin chamber.

20. A coin operated parking meter including, a base member adapted to be anchored to a support and having electrical lead wires extending thereinto, an upper housing mounted on the base and having means for making electrical connection with the wires when mounted on said base, said connection being broken when the housing is removed, said housing having a coin chamber therein and having an opening in its wall for permitting access to said chamber, a coin container within the chamber, a sleeve slidable on the exterior of the housing for closing said opening, a transformer removably mounted above the coin chamber within the housing and insertable through the access opening and coin chamber, said transformer being electrically connected to the lead wires when mounted within the housing, a coin receiving and dial unit removably mounted within the housing above the transformer and adapted to be electrically connected with said transformer and lead wires when inserted within the housing, electrical illuminating elements carried by the unit and supplied with electrical current by said transformer and said wires, means for conducting coins from said unit to the container within the coin chamber, a removable cap closing the upper end of the housing, a locking rod extending vertically through the housing for preventing removal of the cap, and a single lock for actuating said locking bar and also for locking the slidable sleeve in position over the access opening.

21. A coin operated parking meter including, a tubular housing having an opening therein, a time indicating mechanism within the housing and visible through said opening, means for illuminating the opening to increase the visibility of the mechanism, an overtime signal mounted within the housing and normally illuminated when the time indicating mechanism is inactive, means for operating the time indicating mechanism, control means for controlling the illumination of the opening illuminating means and the overtime signal, and means actuated by the insertion of a coin into the meter for setting the time mechanism operating means into motion to operate said mechanism and also for operating the control means for the opening illuminating means and the overtime signal to illuminate said illuminating means and to extinguish said overtime signal.

22. A coin operated parking meter including, a tubular housing having an opening therein, a time indicating mechanism within the housing and visible through said opening, means for illuminating the opening to increase the visibility of the mechanism, an overtime signal mounted within the housing and normally illuminated when the time indicating mechanism is inactive, means for operating the time indicating mechanism, control means for controlling the illumination of the opening illuminating means and the overtime signal, means actuated by the insertion of a coin into the meter for setting the time mechanism operating means into motion to operate said mechanism and also for operating the control means for the opening illuminating means and the overtime signal to illuminate said illuminating means and to extinguish said overtime signal, and means actuated by the time indicating mechanism for again operating the illumination control means to relight the overtime signal when the parking period as indicated by the time indicating mechanism has expired.

23. A coin operated parking meter including, a tubular housing having an opening therein, a time indicating mechanism within the housing and visible through said opening, means for illuminating the opening to increase the visibility of the mechanism, an overtime signal mounted within the housing and normally illuminated when the time indicating mechanism is inactive, means for operating the time indicating mechanism, control means for controlling the illumination of the opening illuminating means and the overtime signal, means actuated by the insertion of a coin into the meter for setting the time mechanism operating means into motion to operate said mechanism and also for operating the control means for the opening illuminating means and the overtime signal to illuminate said illuminating means and to extinguish said overtime signal, and means associated with the time indicating mechanism for again operating the illuminating control means to extinguish the opening illuminating means and relight the overtime signal when the parking period as indicated by the time indicating mechanism has expired.

24. A coin operated parking meter including, a tubular housing having an opening therein, a time indicating mechanism within the housing and visible through said opening, means for illuminating the opening to increase the visibility of the mechanism, an overtime signal mounted within the housing and normally illuminated when the time indicating mechanism is inactive, means for operating the time indicating mechanism, control means for controlling the illumination of the opening illuminating means and the overtime signal, means actuated by the insertion of a coin into the meter for setting the time mechanism operating means into motion to operate said mechanism and also for operating the control means for the opening illuminating means and the overtime signal to illuminate said illuminating means and to extinguish said overtime signal, said control means being arranged to be moved to a position whereby both the opening illuminating and the overtime signal are lighted, and means actuated by the time indicating mechanism for moving said control means to such position to simultaneously light the opening illuminating means and the overtime signal for a predetermined length of time prior to the expiration of the parking period as indicated by the time mechanism.

25. A coin operated parking meter including, a tubular housing having an opening therein, a time indicating mechanism within the housing and visible through said opening, and adapted to indicate a complete parking period upon each operation thereof, means for illuminating the opening to increase the visibility of the mechanism, an overtime signal mounted within the housing and normally illuminated when the time indicating mechanism is inactive, means for operating the time indicating mechanism, means actuated by the insertion of a coin into the meter for resetting the indicating mechanism to return it to a starting position from which it has moved on the previous operation, control means for controlling the illumination of the opening illuminating means and the overtime signal, and means actuated by the insertion of a coin into the meter for setting the time mechanism operating means into motion to operate said mechanism and also for operating the control means for the opening illuminating means and the overtime signal to illuminate said illuminating means and to extinguish said overtime signal.

26. A coin operated parking meter including, a tubular housing having an opening therein, a time indicating mechanism within the housing and visible through said opening, and adapted to indicate a complete parking period upon each operation thereof, means for illuminating the opening to increase the visibility of the mechanism, an overtime signal mounted within the housing and normally illuminated when the time indicating mechanism is inactive, means for operating the time indicating mechanism, means actuated by the insertion of a coin into the meter for resetting the indicating mechanism to return it to a starting position from which it has moved on the previous operation, control means for controlling the illumination of the opening illuminating means and the overtime signal, means actuated by the insertion of a coin into the meter for setting the time mechanism operating means into motion to operate said mechanism and also for operating the control means for the opening illuminating means and the overtime signal to illuminate said illuminating means and to extinguish said overtime signal, said control means being arranged to be moved to a position whereby both the opening illuminating and the overtime signal are lighted, and means actuated by the time indicating mechanism for moving said control means to such position to simultaneously light the opening illuminating means and the overtime signal for a predetermined length of time prior to the expiration of the parking period as indicated by the time mechanism.

27. A coin operated parking meter including, a tubular housing having diametrically opposed alined openings therein, time indicating rotatable dials within the housing and visible through the alined openings whereby said dials may be readily observed from opposite sides of the housing, said dials being arranged to be placed into operation by the insertion of a coin into the meter so as to indicate a complete parking period, means for illuminating the openings to increase the visibility of the indicating dials, means actuated by the insertion of a coin into the meter for resetting the dials to return them to a starting position from which said dials have been moved on the previous operation, a visible overtime signal mounted in the housing and normally illuminated when the dials are inactive prior to the insertion of a coin, control means for controlling the lighting and extinguishing of the illuminating means for the openings and of the overtime signal, means for actuating the control means when a coin is inserted to extinguish the overtime signal and light the illuminating means, and means actuated by the dials for again actuating the control means to relight the overtime signal when the parking period has expired.

28. A coin operated parking meter including a tubular housing having diametrically opposed alined openings therein, time indicating rotatable dials within the housing and visible through the alined openings whereby said dials may be readily observed from opposite sides of the housing, said dials being arranged to be placed into operation by the insertion of a coin into the meter so as to indicate a complete parking period, means for illuminating the openings to increase the visibility of the indicating dials, means actuated by the insertion of a coin into the meter for resetting the dials to return them to a starting position from which said dials have been moved on the previous operation, a visible overtime signal mounted in the housing and normally illuminated when the dials are inactive prior to the insertion of a coin, control means for controlling the lighting and extinguishing of the illuminating means for the openings and of the overtime signal, means for actuating the control means when a coin is inserted to extinguish the overtime signal and light the illuminating means, and means actuated by the dials for again actuating the control means to relight the overtime signal when the parking period has expired, the last named means also operating said control means to maintain the opening illuminating means lighted for a predetermined length of time after the overtime signal has been relighted, after which said illuminating means is extinguished, whereby the overtime signal and opening illuminating means are both lighted during such predetermined length of time immediately following the expiration of the parking period.

29. A coin operated parking meter including, a housing having alined openings in opposite sides thereof, rotatable time indicating dials within the housing and visible through the openings, said dials being spaced from each other and having apertures therein, a coin passage extending between the dials, means for retaining said coin within the passage in alinement with said apertures whereby said coin is visible through the openings in said housing, means for rotating the dials, means for illuminating the openings to increase the visibility of the dials and coin, an overtime signal mounted within the housing, control means associated with the illuminating means and the overtime signal for controlling the lighting and extinguishing of the illuminating means and signal, and means located within the coin passage and actuated by the passage of a coin therethrough and operatively associated with the operating means for the dials and with the control means, whereby when a coin is inserted, the dials are rotated and the illuminating means and overtime signal are lighted and extinguished in a predetermined manner.

30. A coin operated parking meter including, a housing having alined openings in opposite sides thereof, rotatable time indicating dials within the housing and visible through the openings, said dials being spaced from each other and having apertures therein, a coin passage extending between the dials, means for retaining said coin within the passage in alinement with said apertures whereby said coin is visible through the openings in said housing, means for rotating the dials, means for illuminating the openings to increase the visibility of the dials and coin, an overtime signal mounted within the housing, control means associated with the illuminating means and the overtime signal for controlling the lighting and extinguishing of the illuminating means and signal, means located within the coin passage and actuated by the passage of a coin therethrough and operatively associated with the operating means for the dials and with the control means, whereby when a coin is inserted, the dials are rotated, the control means being arranged so that the overtime signal is extinguished and the illuminating means is lighted upon the insertion of a coin and means actuated by the dials for actuating the control means to relight the overtime signal after the parking period has expired, said last named means again actuating the control means to extinguish the opening illuminating means after a predetermined lapse of time following the relighting of the overtime signal.

31. A coin operated parking meter including, a housing having alined openings in opposite sides thereof, rotatable time indicating dials within the housing and visible through the openings, said dials being spaced from each other and having apertures therein, a coin passage extending between the dials, means for retaining said coin within the passage in alinement with said apertures whereby said coin is visible through the openings in said housing, means for rotating the dials, means for illuminating the openings to increase the visibility of the dials and coin, an overtime signal mounted within the housing, control means associated with the illuminating means and the overtime signal for controlling the lighting and extinguishing of the illuminating means and signal, means located within the coin passage and actuated by the passage of a coin therethrough and operatively associated with the operating means for the dials and with the control means, whereby when a coin is inserted, the dials are rotated, the control means being arranged so that the overtime signal is extinguished and the illuminating means is lighted upon the insertion of a coin, means actuated by the dials for actuating the control means to relight the overtime signal after the parking period has expired, said last named means again actuating the control means to extinguish the opening illuminating means after a predetermined lapse of time following the relighting of the overtime signal, means for releasing the coin from the passage when the next coin is inserted, and means for varying the size of the coin passage so that coins of various sizes may be accommodated.

HERMAN S. JOHNS.